(12) United States Patent
Ooya

(10) Patent No.: US 8,929,004 B2
(45) Date of Patent: Jan. 6, 2015

(54) LENS BARREL

(75) Inventor: Takahiro Ooya, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 47 days.

(21) Appl. No.: 13/102,345

(22) Filed: May 6, 2011

(65) Prior Publication Data

US 2011/0273786 A1 Nov. 10, 2011

(30) Foreign Application Priority Data

May 10, 2010 (JP) ................................ 2010-108414

(51) Int. Cl.
*G02B 7/02* (2006.01)
*G02B 7/10* (2006.01)

(52) U.S. Cl.
CPC ...................................... *G02B 7/102* (2013.01)
USPC ......................................... 359/817; 359/822

(58) Field of Classification Search
USPC .................................. 359/817, 704, 822–823
See application file for complete search history.

(56) References Cited

U.S. PATENT DOCUMENTS

| | | | | |
|---|---|---|---|---|
| 5,150,260 | A * | 9/1992 | Chigira | 359/694 |
| 7,580,623 | B2 * | 8/2009 | Nuno et al. | 396/73 |
| 2008/0310035 | A1 * | 12/2008 | Kato | 359/817 |

FOREIGN PATENT DOCUMENTS

| | | |
|---|---|---|
| JP | 2006-72003 A | 3/2006 |
| JP | 2006-72004 | 3/2006 |
| JP | 2006-330657 | 12/2006 |

* cited by examiner

*Primary Examiner* — Alicia M Harrington
(74) *Attorney, Agent, or Firm* — Oblon, Spivak, McClelland, Maier & Neustadt, L.L.P.

(57) ABSTRACT

A lens barrel includes lens groups, lens retaining frames retaining the lens groups, respectively, between a collapsed state and a photographic state are moved toward an object side, a movable cylinder retaining the plurality of lens retaining frames therewithin, and a driving mechanism to move the lens retaining frames. The driving mechanism includes a main guide shaft parallel to the photographic axis and supports a retractable lens retaining frame retaining a retractable lens group movably along and rotatably about the main guide shaft, a lead screw disposed in parallel with the main guide shaft and to be driven to rotate, a screw member to be screwed on the lead screw by coming into contact with the lead screw in directions perpendicular to the lead screw to be moved along the lead screw by a rotation of the lead screw, and a cam structure connecting the retractable lens retaining frame with the screw member to convert a movement of the screw member along the lead screw into a rotary motion of the retractable lens retaining frame about the main guide shaft and a linear motion of the retractable lens retaining frame along the main guide shaft.

17 Claims, 23 Drawing Sheets

LENS BARREL

CROSS REFERENCE TO RELATED APPLICATIONS

The present application is based on and claims priority from Japanese Application Number 2010-108414, filed on May 10, 2010, the disclosure of which is hereby incorporated by reference herein in its entirety.

BACKGROUND OF THE INVENTION

1. Field of the Invention

The present invention relates to a lens barrel in which a lens group is collapsed in one state and the lens group extends out toward a predetermined position in another state.

2. Description of the Related Art

In an imaging apparatus such as a digital camera or a digital video camera (hereinafter, referred to as a digital camera), improvement in photographic performance and a portability has been highly required. Therefore, the imaging apparatus has a lens barrel in which a photographic lens having a plurality of lens groups is built in, so as to allow focal length to be variable. In the imaging apparatus, at least one lens group is retracted from the photographic optical axis while the lens groups are collapsed and stored in a camera housing with minimum distances from each other less than distances required for photographing in a non-photographic state and the lens groups extends out from the camera housing so as to have distances from each other sufficiently for photographing in a photographic state. In such an imaging apparatus, the focal length is changed to perform photographing with a desired field of angle and the lens barrel is set in a collapsed state to be preferable for portability.

However, in this technology, the stored position of the lens group retracted from the photographic optical axis is substantially inner side of the maximum diameter of the fixed cylinder of the camera body. Therefore, although the size in the photographic optical axis direction in a state where the movable cylinder is stored in the camera body can be reduced, the outer diameter of the fixed cylinder increases so that the camera body becomes large when being viewed from a front (object) side.

Then, it has been known that at least one lens group is retracted out of the inner diameter of the movable cylinder by a retractable lens retaining frame (see Japanese Patent Application Publication No. 2006-330657). In this lens barrel, the retractable lens retaining frame is retracted out of the movable cylinder by a driving force from a driving mechanism in the collapsed state (when not photographing). The driving mechanism has a main guide shaft parallel to the photographic optical axis, a compression torsion spring provided on the main guide shaft, a lead screw parallel with the main guide shaft, and a female screw member screwed with the lead screw via a screw hole. The retractable lens retaining frame is supported movably along a longitudinal direction of the main guide shaft and rotatably about the main guide shaft. By the compression torsion spring supported by the main guide shaft, a rotation biasing force for biasing the lens retaining frame onto the photographic optical axis about the main guide shaft as a base point, a linear biasing force on the main guide shaft in the collapsed direction are applied to the retractable lens retaining frame. The female screw member moved along the axis of the lead screw by the rotation of the lead screw is connected to the retractable lens retaining frame via the cam structure. The cam structure is configured to convert the movement of the female screw member on the axis into a rotary motion of the retractable lens retaining frame about the main guide shaft against biasing of the compression torsion spring and a linear motion of the retractable lens retaining frame along the main guide shaft against biasing of the compression torsion spring. In this lens barrel, the lead screw is appropriately driven to be rotated to move the female screw member and thereby the retractable lens retaining frame is rotated about the main guide shaft against the rotation biasing force so as to retract the retained lens group out of the inner diameter of the movable cylinder. Thereby, in the lens barrel, compared with the conventional configuration in that the lens group is retracted inside the fixed cylinder, the outer diameter of the movable cylinder can be prevented from increasing without increasing distances between lens groups in the collapsed state.

However, in the conventional lens barrel, the lead screw is screwed with the female screw member with the screw hole in which the lead screw is inserted, the female screw member is rotated with the rotation of the lead screw so that there is possibility that the connection between the female screw member and the retractable lens retaining frame in the cam structure is released. In order to prevent this rotation, the female screw member has a rotation stop projected portion and the rotation stop projected portion is inserted in a guide groove extending along the axis line of the lead screw. The rotation stop projected portion is loosely fitted in the guide groove so as to allow the female screw member to be smoothly moved. Therefore, in the driving mechanism, one side surface of the rotation stop projected portion in accordance with the rotational direction of the lead screw comes into contact with one side surface of the guide groove and when the lead screw is inversely rotated, the rotation stop projected portion is rotated in the guide groove and the other side surface of the rotation stop projected portion comes into contact with the other side surface of the guide groove. Therefore, in the conventional lens barrel, due to the loosely fitting of the rotation stop projected portion and the guide groove, when the lead screw is inversely rotated, it is possible that hitting sound of the rotation stop projected portion onto the guide groove is generated and the position of the female screw member on the lead screw, that is, the position of the retractable lens retaining frame in the photographic optical axis direction differs in difference of the rotational direction of the lead screw.

SUMMARY OF THE INVENTION

An object of the present invention is to provide a lens barrel capable of preventing occurrence of hitting sound due to movement of the retractable lens retaining frame configured to retract a lens group out of an inner diameter of the movable cylinder and the position accuracy of the retractable lens retaining frame in the photographic optical axis direction can be improved.

To achieve this object, a lens barrel according to one embodiment of the present invention includes a plurality of lens groups including a retractable lens group having at least one lens, a plurality of lens retaining frames configured to retain the plurality of lens groups, respectively, between a collapsed state in which at least one portion of the plurality of lens groups is stored and a photographic state in which the at least one portion of the plurality of lens groups is moved toward an object side, the plurality of lens retaining frames including a retractable lens retaining frame configured to retain the retractable lens group, a movable cylinder configured to retain the plurality of lens retaining frames therewithin, and a driving mechanism configured to move the plurality of lens retaining frames so as to position the plurality of lens groups on a photographic optical axis in the photographic state and retract the retractable lens group to a position outside an inner diameter of the movable cylinder in the collapsed state. The driving mechanism includes a main guide shaft disposed parallel to the photographic optical axis and configured to support the retractable lens retaining frame movably along a longitudinal direction of the main guide shaft and rotatably about an axis line of the main guide shaft, a lead screw disposed in parallel with the main guide shaft and configured to be driven to rotate, a screw member configured to be screwed on the lead screw by coming into contact with the lead screw in directions perpendicular to an axis line of the lead screw to be moved along the lead screw by a rotation of the lead screw, a cam structure configured to connect the retractable lens retaining frame with the screw member to convert a movement of the screw member along the lead screw into a rotary motion of the retractable lens retaining frame about the main guide shaft and a linear motion of the retractable lens retaining frame along the main guide shaft, and a screw member pressing device configured to press the screw member toward the lead screw so as to come into contact with the lead screw in the directions perpendicular to the axis line of the lead screw.

DETAILED DESCRIPTION OF THE PREFERRED EMBODIMENTS

Hereinafter, a lens barrel and an imaging apparatus having the lens barrel according to preferred embodiments of the present invention will be explained in detail with reference to the accompanying drawings below.

Examples

A schematic configuration of the lens barrel 10 as an example of the lens barrel according to an embodiment of the present invention will be explained with reference to FIGS. 1 to 9

The lens barrel 10 includes a plurality of lens groups including a retractable lens group having at least one lens, a plurality of lens retaining frames configured to retain the plurality of lens groups, respectively, between a collapsed state in which at least one portion of the plurality of lens groups is stored and a photographic state in which the at least one portion of the plurality of lens groups is moved toward an object side, the plurality of lens retaining frames including a retractable lens retaining frame configured to retain the retractable lens group, a movable cylinder configured to retain the plurality of lens retaining frames therewithin, and a driving mechanism configured to move the plurality of lens retaining frames so as to position the plurality of lens groups on a photographic optical axis in the photographic state and retract the retractable lens group to a position outside an inner diameter position of the movable cylinder in the collapsed state.

Figure 4:
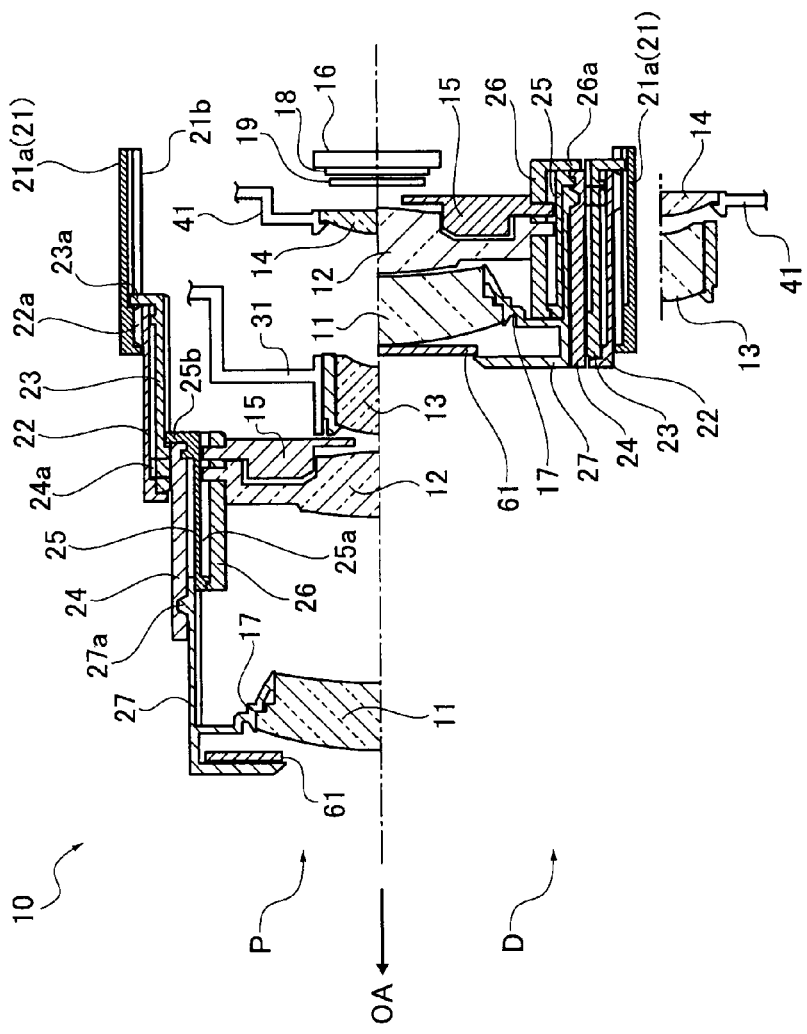
FIG. 4 is a sectional view showing each lens group, each lens retaining frame and main parts of the lens barrel in the photographic state P where each lens group extends and in the collapsed stored state D where each lens group is stored.
Figure 5:
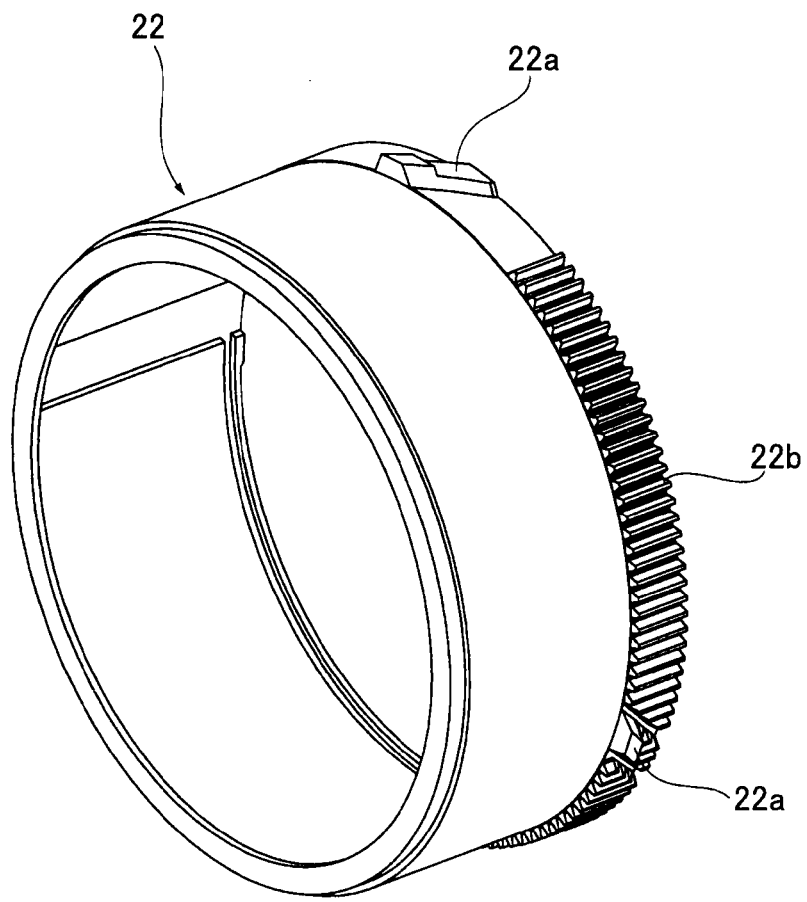
FIG. 5 is a perspective view showing a first rotary cylinder to be fitted in a helicoid.

That is, an optical device including the lens barrel 10 has, as shown in FIG. 4, a first lens group 11, a second lens group 12, a third lens group 13, a fourth lens group 14, a shutter/aperture unit 15, a solid-state image pickup device 16, a first lens retaining frame 17, a cover glass 18, a low-pass filter 19, a fixed frame 21, a first rotary cylinder 22, a first liner 23, a second rotary cylinder 24, a second liner 25, a cam cylinder 26, a linear motion cylinder 27, a zoom motor 51, a lens barrier 61, a lens barrel base 81, and a pressing plate 82. The zoom motor 51 functions as a lens retaining frame driving device configured to drive movable lens retaining frames via the movable cylinder with a spline gear, and the like. The first rotary cylinder 22, the first liner 23, the second rotary cylinder 24, the second liner 25, the cam cylinder 26, and the linear motion cylinder 27 function as the movable lens retaining frames.

In the optical device as a photographic lens system, in the photographic state P (see a half part of FIG. 4), the first lens group 11, the second lens group 12, the third lens group 13, and the fourth lens group 14 are sequentially disposed in order from an object side, the shutter/aperture unit 15 is disposed between the second lens group 12 and the third lens group 13, and the solid-state image pickup device 16 configured by use of a CCD (charge-coupled device) and the like is disposed at an image side of the fourth lens group 14. The first to fourth lens groups 11 to 14 constitute a zoom lens with a variable focal length.

The first lens group 11 has at least one lens. The first lens group 11 is fixed and retained on the linear motion cylinder 27 through the first lens retaining frame 17 integrally retaining lenses in the first lens group 11. The known lens barrier 61 is provided at the object side of the first lens group. The lens barrier 61 is configured to open a light path of the photographic lens system in the photographic state and block the light path in the collapsed state.

The second lens group 12 has at least one lens. In the second lens group 12, a cam follower is formed in the not-clearly illustrated second lens retaining frame configured integrally retain the second lens group 12 and the cam follower is inserted into a cam groove (see FIG. 7) for second lens group, which is provided in the cam cylinder 26 to engage with the linear motion groove 25a of the second liner 25 so that the second lens group 12 is supported by the cam cylinder 26 and the second liner 25.

The third lens group 13 has at least one lens. The third lens group 13 is integrally retained by the third lens retaining frame 31. The third lens group 13 is retracted from a position on the photographic optical axis OA (photographic light path) in the collapsed state and disposed on the photographic optical axis in the photographic state, as described in detail below.

The fourth lens group has at least one lens. The fourth lens group 14 is integrally retained by the fourth lens retaining frame 41. The fourth lens group is retracted from a position on the photographic optical axis OA in the collapsed state and disposed on the photographic optical axis OA in the photographic state, as described in detail below.

The shutter/aperture unit 15 includes a shutter and an aperture stop. A cam follower is integrally formed on the shutter/aperture unit 15 and a cam groove (see FIG. 7) for the shutter/aperture unit is provided on the cam cylinder. The cam follower is inserted into the cam groove to engage with the linear motion groove 25a of the second liner 25 so that the shutter/aperture unit 15 is supported by the cam cylinder 26 and the second liner 25.

The fixed frame 21 has a cylindrically-shaped fixed cylinder 21a inside thereof. The fixed cylinder 21a has an inner circumferential surface on which a linear motion groove 21b extending along an axial direction and a cam groove (see FIG. 9) are formed. A helicoidal cam follower 22a (see FIG. 5) is formed on an outer circumferential surface of a base end section of the first rotary cylinder 22 and the cam follower 22a is engaged with the cam groove. A key portion 23a (see FIG. 2) formed to be projected on an outer periphery of a base end section of the first liner 23 is engaged with the linear motion groove 21b of the fixed cylinder 21a (fixed frame 21).

On an inner surface of the first rotary cylinder 22, although not illustrated, a guide groove along a plane perpendicular to the photographic optical axis OA is formed. A follower (or a key) as a linear motion guide member is formed to be projected on an outer circumferential surface of the first liner 23 at a vicinity of the base end section of the first liner 23. The guide groove is engaged with the follower (or key) as the linear motion guide member.

A linear motion groove extending along a direction of the photographic optical axis OA and a helicoid are formed on an inner surface of the first liner 23. A cam follower is formed to be projected on an outer circumferential surface of the second rotary cylinder 24 at the vicinity of the base end section of the second rotary cylinder 24. An escape groove in which the cam follower is to be inserted (see FIG. 8) is formed on the first liner 23.

Although not illustrated, a helicoid is formed on the outer circumferential surface of the base end section of the second rotary cylinder 24, and the helicoid is screwed on the helicoid provided on an inner peripheral of the first liner 23. A cam follower 24a (see FIG. 4) is formed to be projected on the outer circumferential surface of the second rotary cylinder 24 at the vicinity of the base end section of the second rotary cylinder 24. The cam follower 24a is engaged with the linear motion groove provided on the inner peripheral of the first rotary cylinder 22 via the escape groove of the first liner 23.

A key portion 25b is formed to be projected on the outer peripheral of the base end section of the second liner 25 and engaged with the linear motion groove (see FIG. 8) provided on the inner peripheral of the first liner 23. A guide groove (see FIG. 6) along a plane perpendicular to the photographic optical axis OA is formed on the inner circumferential surface of the second rotary cylinder 24. A follower (or a key) which is a linear motion guide member, is formed to be projected on an outer circumferential surface of the second liner 25 and engaged with the guide groove. According to such a configuration, the second liner 25 and the second rotary cylinder 24 are moved together with each other in the direction of the photographic optical axis and configured to be moved relatively rotatably about the photographic optical axis OA.

A cam cylinder 26 is fitted in an inner peripheral of the second liner 25. A latching projection 26a is formed to be projected on an outer peripheral of the base end section of the cam cylinder 26. The cam cylinder 26 is configured to be operated together with the second rotary cylinder 24 by fitting the latching projection 26a to latch on the base end section of the second rotary cylinder 24. On the inner circumferential surface of the second liner 25, although not illustrated, a guide groove along a plane perpendicular to the photographic optical axis is formed. A follower (or key) as the linear motion guide member formed to be projected at the outer circumferential surface (front side) is engaged with the guide groove. According to such a configuration, the cam cylinder 26 and the second liner 25 are configured to be moved together with each other in the direction of the photographic optical axis and moved relatively rotatably about the photographic optical axis.

Between the second liner 25 and the second rotary cylinder 24, a base end section side portion of the linear motion cylinder 27 is inserted. The cam follower 27a is formed to be projected on the outer circumferential surface of the linear motion cylinder 27 at the vicinity of the base end section thereof and engaged with the cam groove (see FIG. 6) formed on the inner circumferential surface of the second rotary cylinder 24. On the inner circumferential surface of the linear motion cylinder 27, although not illustrated, a linear motion groove along the axis direction is formed and engaged with the key portion of the outer circumferential surface of the second liner 25.

On the outer peripheral of the base end section of the first rotary cylinder 22, a gear portion 22b (see FIG. 5) is formed. A driving force of the zoom motor 51 (see FIG. 1) is appropriately transmitted via a not-illustrated gear screwed on the gear portion 22b so that the first rotary cylinder 22 is rotated. Thereby, a predetermined zooming operation is performed by the first lens group 11, the second lens group 12 and the shutter/aperture unit 15.

Figure 6:
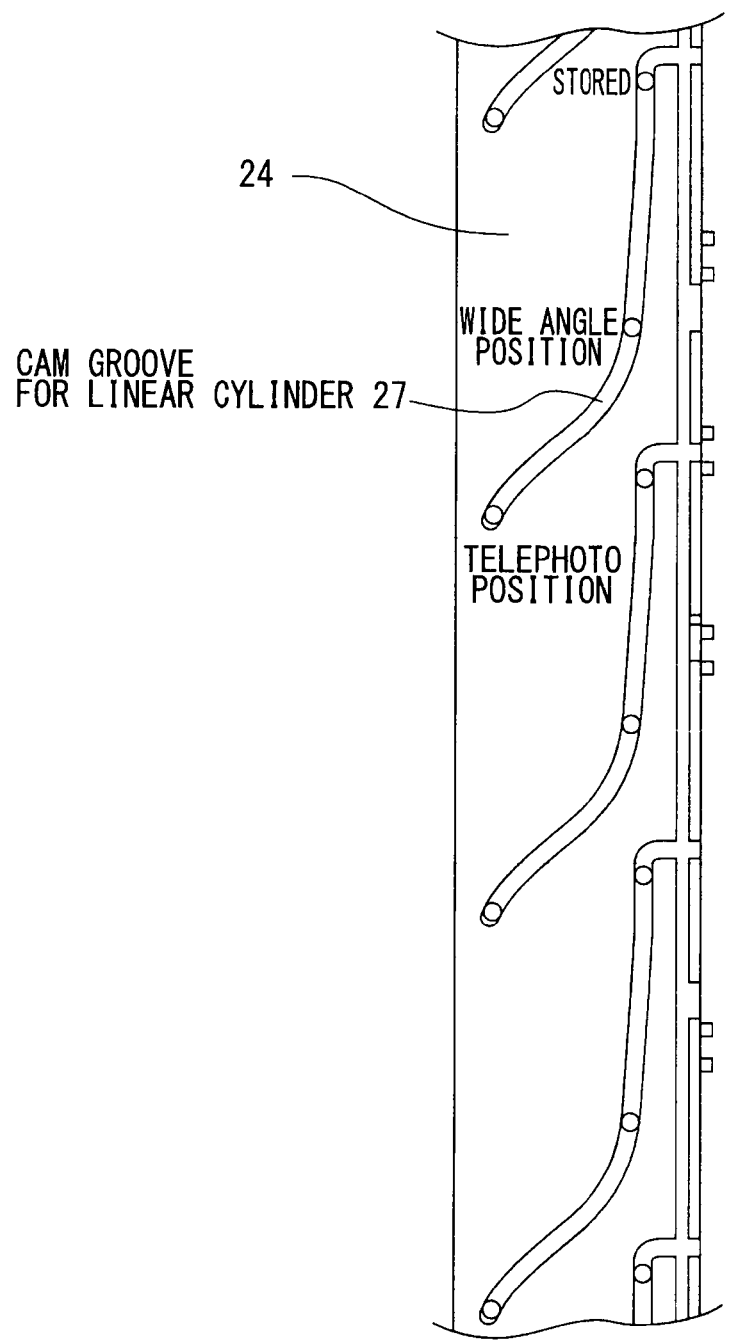
FIG. 6 is a development view schematically showing a cam groove which is formed on a second rotary cylinder.
Figure 7:
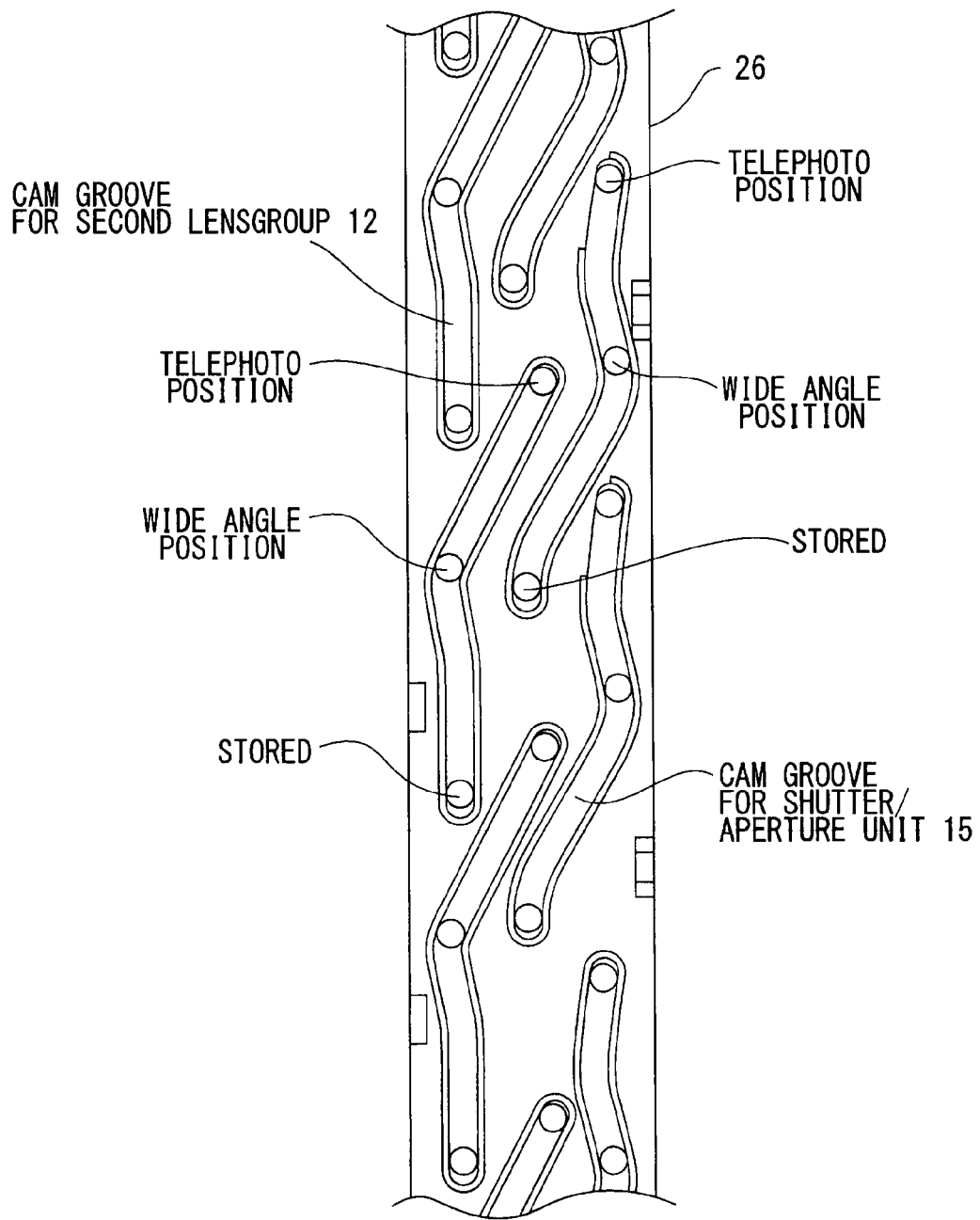
FIG. 7 is a development view schematically showing a cam groove which is formed on a cam cylinder.
Figure 8:
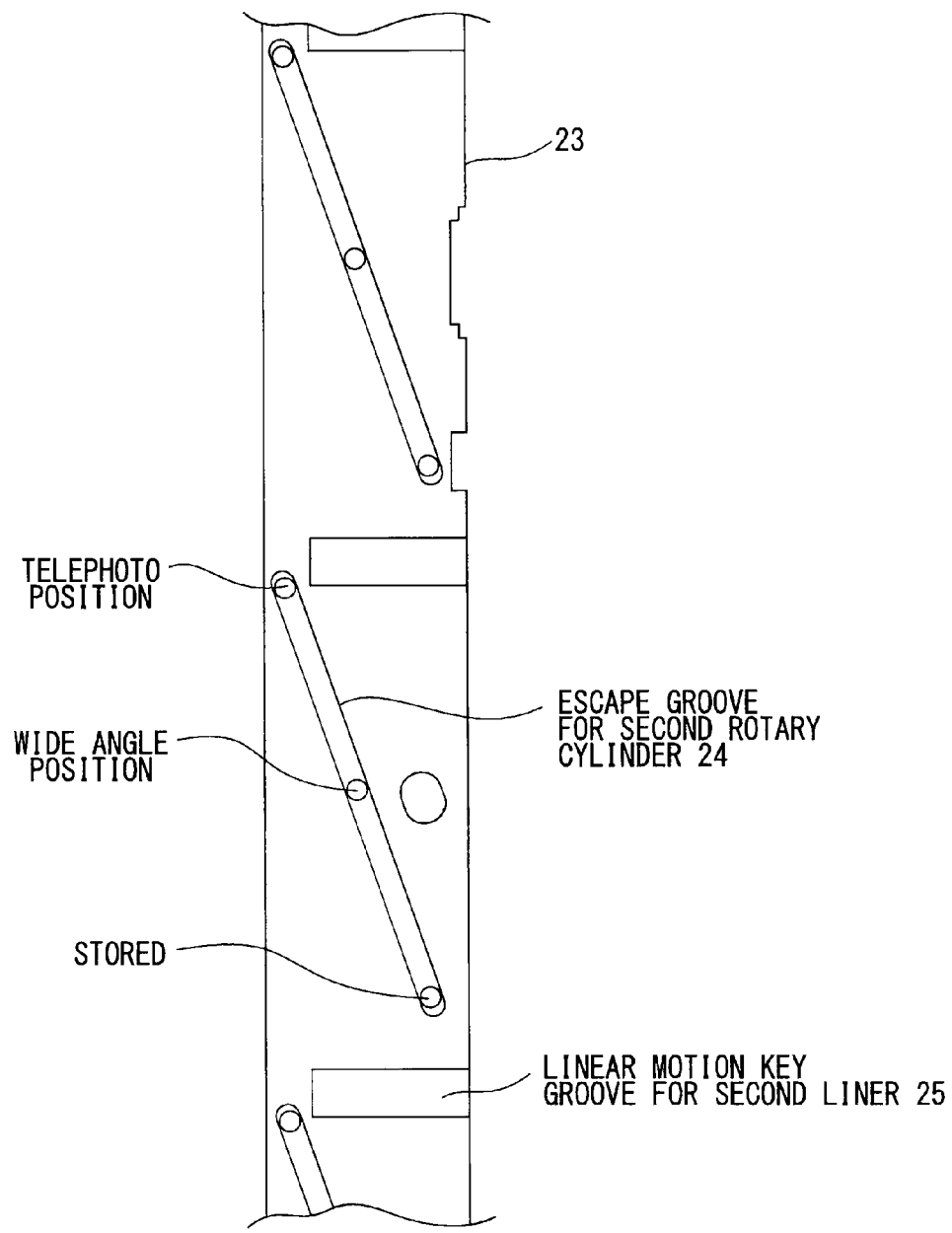
FIG. 8 is a development view schematically showing a cam groove and a key groove formed on a first liner with a helicoid omitted.
Figure 9:
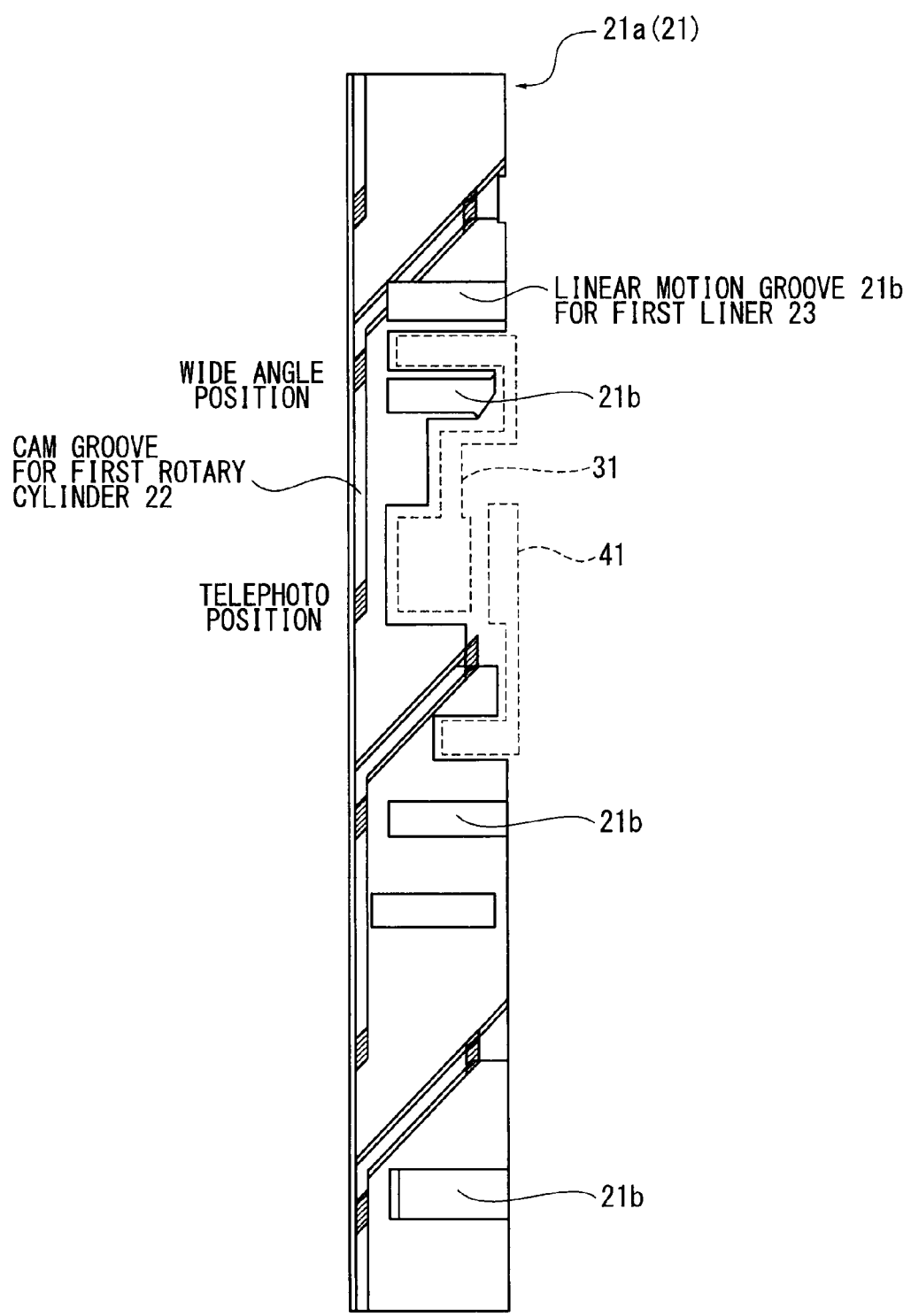
FIG. 9 is a development view schematically showing a cam groove and a key groove formed on a fixed cylinder of a fixed frame with a helicoid omitted.

The cam groove, in the second rotary cylinder 24, configured to be engaged with the cam follower of the linear motion cylinder 27 is shown in FIG. 6. The cam groove engaged with the cam follower of the second lens retaining frame for the second lens group 12 and the cam groove engaged with the cam follower of the shutter/aperture unit 15 in the cam cylinder 26 are shown in FIG. 7. The escape groove for the cam follower of the second rotary cylinder 24 and the linear motion groove engaged with the key portion of the second liner 25 in the first liner 23 are shown in FIG. 8. The linear motion groove 21b engaged with the key portion 23a of the first liner 23 and the cam groove engaged with the cam follower 22a of the first rotary cylinder 22 in the fixed cylinder 21a of the fixed frame 21 are shown in FIG. 9.

That is, in the above described configuration, the first rotary cylinder 22 is not merely helicoidally screwed with the fixed frame 21 but also engaged with the helicoidal cam groove (see FIG. 9), and when driving the lens barrel from collapsed state to a wide angle position, the first rotary cylinder 22 is completely extended out at a maximum extended position. Then, as shown in FIG. 9, an object side end portion of the cam groove is parallel to an end surface of the fixed frame so that the first rotary cylinder 22 is rotated at a fixed position without moving in the photographic optical axis direction when driving the lens barrel from a wide angle position to a telephoto position. Therefore, when moving from the collapsed state to the wide angle position, the first rotary cylinder 22 is, at first, extended out to the object side while rotating, and then at a middle of rotation, reaches the maximum extended position. When the first rotary cylinder 22 reaches the maximum extended position, a zoom position reference signal is generated by a not-illustrated zoom position detector which is configured by, for example, a photoreflector, a photointerruptor, a leaf switch, or the like, disposed in the fixed frame 21.

Accordingly, when the zoom position reference signal is generated, it is assumed that the first rotary cylinder 22 reaches the maximum extended position, and therefore inserting operation of elements disposed at the object side in the retractable lens retaining frame, that is, the third lens retaining frame 31 configured to retain the third lens group 13, in the photographic optical axis direction can be started. That is, in an early stage of the extending operation, the first rotary cylinder 22 which is close to the fixed frame 21 and the first liner 23 are completely extended out, a space in which the third lens retaining frame 31 is inserted to be positioned on the photographic optical axis OA can be preliminarily ensured.

If the inserting operation of third lens retaining frame 31 is started immediately after the space is ensured, the above zoom position reference signal is generated immediately after the first rotary cylinder 22 reaches the maximum extended position. Accordingly, it can be possible to minimize time required for moving from the collapsed state to the wide angle state, for example, when power is turned on.

Positions of the first rotary cylinder 22, and the like can be controlled by the zoom motor 51 (see FIG. 1) configured by use of a general DC (direct current) motor, in this case, by use of counts of driving pulses generated by the zoom position detector configured by, for example, a pinion gear in an encoder form and directly fixed to an output shaft of the zoom motor 51 and a photointerruptor disposed at a vicinity thereof Although a driving source for moving the first rotary cylinder 22 is configured to detect a driving position by a detector having the encoder and the photointerruptor as a DC motor, it may be replaced by a pulse motor to achieve the same function.

Next, a configuration of the lens barrel 10, in that, the third lens group 13 and the fourth lens group 14 are retracted from positions on the photographic optical axis OA (photographic light path) in the collapsed state and disposed on the photographic optical axis OA in the photographic state will be explained with reference to FIGS. 1 to 4 and 10 to 21.

Figure 1:
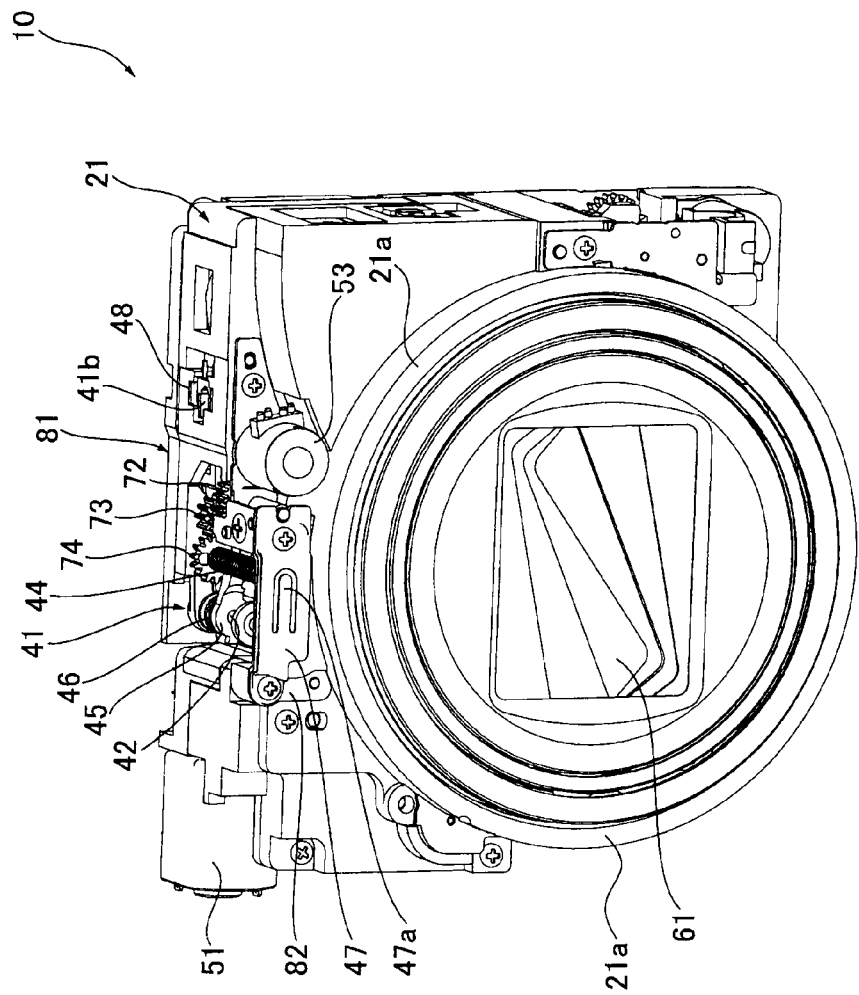
FIG. 1 is a perspective view schematically showing a lens barrel as an example of the present invention in a collapsed stored state D as viewed from an object side.
Figure 2:
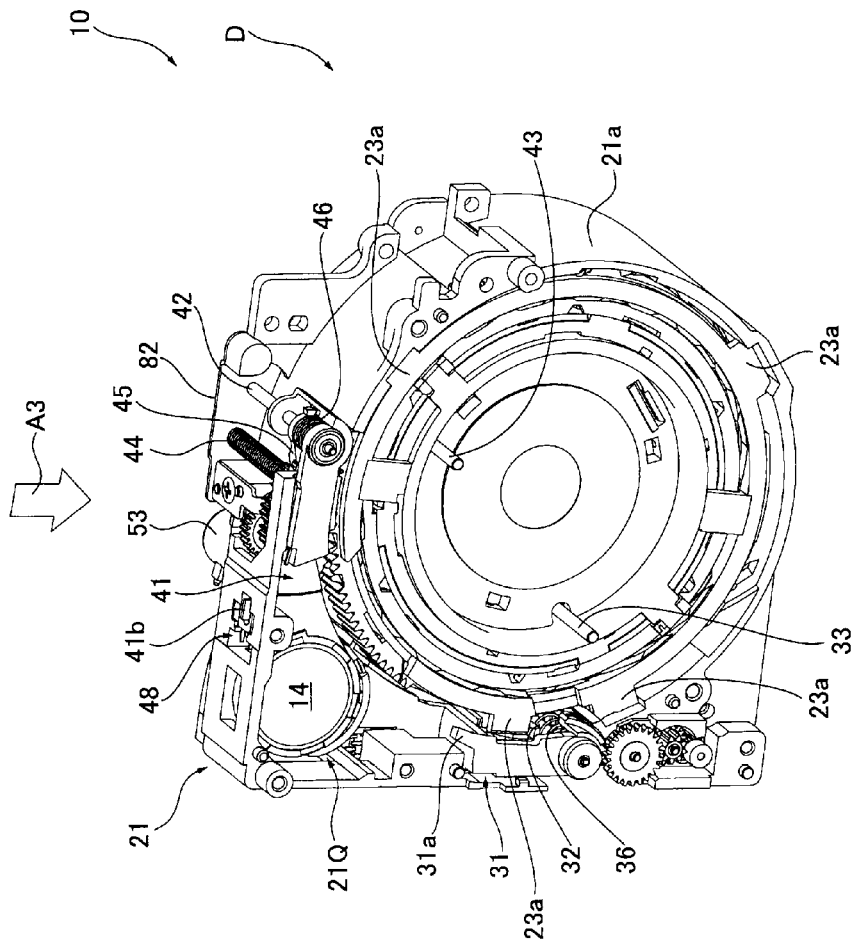
FIG. 2 is a perspective view schematically showing the lens barrel in a collapsed stored state D as viewed from an image plane side.
Figure 3:
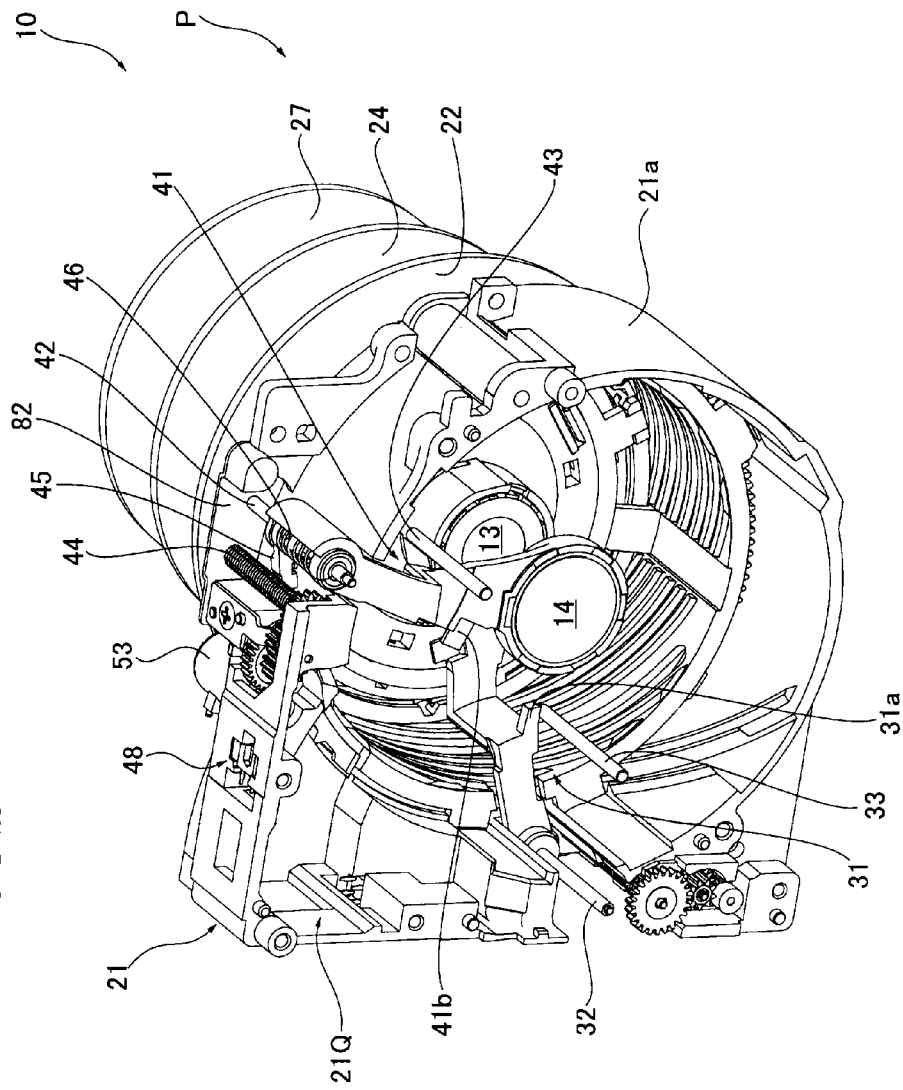
FIG. 3 is a perspective view schematically showing the lens barrel in a photographic state P as viewed from the object side.

In the lens barrel 10, as shown in FIGS. 1 to 3, the third lens retaining frame 31 is provided on a side portion of the fixed frame 21 as viewed from a front side, and the fourth lens retaining frame 41 is provided on an upper side portion of the fixed frame 21. At a corner portion of the fixed frame 21, a storing space 21Q as a retracted position in which the third lens retaining frame 31 and the fourth lens retaining frame 41 are stored is formed (see FIGS. 2 and 3). The storing space 21Q is provided at a position outside the fixed cylinder 21a of the fixed frame 21. A notch portion (see FIG. 9) is provided on the fixed cylinder 21a. Through the notch portion, the third lens retaining frame 31 and the fourth lens retaining frame 41 can be moved into the inner position of the fixed cylinder 21a. Therefore, as shown in FIGS. 2 to 4, the third lens retaining frame 31 and the fourth lens retaining frame 41 can be retracted to a position outside a maximum outer diameter of the movable cylinder, for example, a maximum diameter of the first rotary cylinder 22 in this embodiment, in the collapsed state. The third lens group 13 and the fourth lens group 14 are stored in an overlapped state in the optical axis direction in the storing space 21Q (see FIGS. 2 to 4).

The third lens retaining frame 31 and the fourth lens retaining frame 41 are, as shown in FIG. 4, disposed between the shutter/aperture unit 15 and the solid-state image pickup device 16. In this embodiment, the third lens retaining frame 31 is disposed most close to the shutter/aperture unit 15, and the fourth lens retaining frame 41 is disposed most close to the solid-state image pickup device 16. The third lens retaining frame 31 and the fourth lens retaining frame 41 have respective driving mechanisms and are configured, by the respective driving mechanisms, to retracted from the photographic optical axis OA (photographic light path) and stored in the storing space 21Q in the collapsed state (see FIG. 2) where the rotary cylinders 22, 24 and linear motion cylinder 27 (also referred to as movable cylinders) are stored in the fixed frame 21, and configured to be moved to the positions on the photographic optical axis OA (photographic light path) and moved in the direction of the photographic optical axis OA in the photographic state or an extending state (see FIG. 3) where the rotary cylinders 22, 24 and linear motion cylinder 27 are extended from the fixed frame 21, respectively.

In this embodiment, both of the third lens group 13 and the fourth lens group 14 are retracted. Accordingly, the fourth lens retaining frame 41 is moved at first to the stored position (storing space 21Q) in the storing operation and then storing operation of the third lens retaining frame 31 for the third lens group 13, disposed at the object side (front side) from the fourth lens group 14 is permitted so that the third lens retaining frame 31 is moved to the stored position (storing space 21Q). After the retraction of the third lens retaining frame 31 is completed, movement of the first lens group 11, the second lens group 12, and the shutter/aperture unit 15 to the positions in the collapsed stored positions is permitted.

At first, the driving mechanism includes a main guide shaft (42) disposed parallel to the photographic optical axis and configured to support the retractable lens retaining frame movably along a longitudinal direction of the main guide shaft and rotatably about an axis line of the main guide shaft, a lead screw (44) disposed in parallel with the main guide shaft and configured to be driven to rotate, a screw member (45) configured to be screwed on the lead screw by coming in contact with the lead screw in directions perpendicular to an axis line of the lead screw to be moved along the lead screw by a rotation of the lead screw, a cam structure (45d, 96a) configured to connect the retractable lens retaining frame with the screw member to convert movement of the screw member along the lead screw into rotary motion of the retractable lens retaining frame about the main guide shaft and a linear motion of the retractable lens retaining frame along the main guide shaft, and a screw member pressing device (46) configured to press the screw member toward the lead screw so as to come in contact with the lead screw in the directions perpendicular to the axis line of the lead screw.

Figure 10:
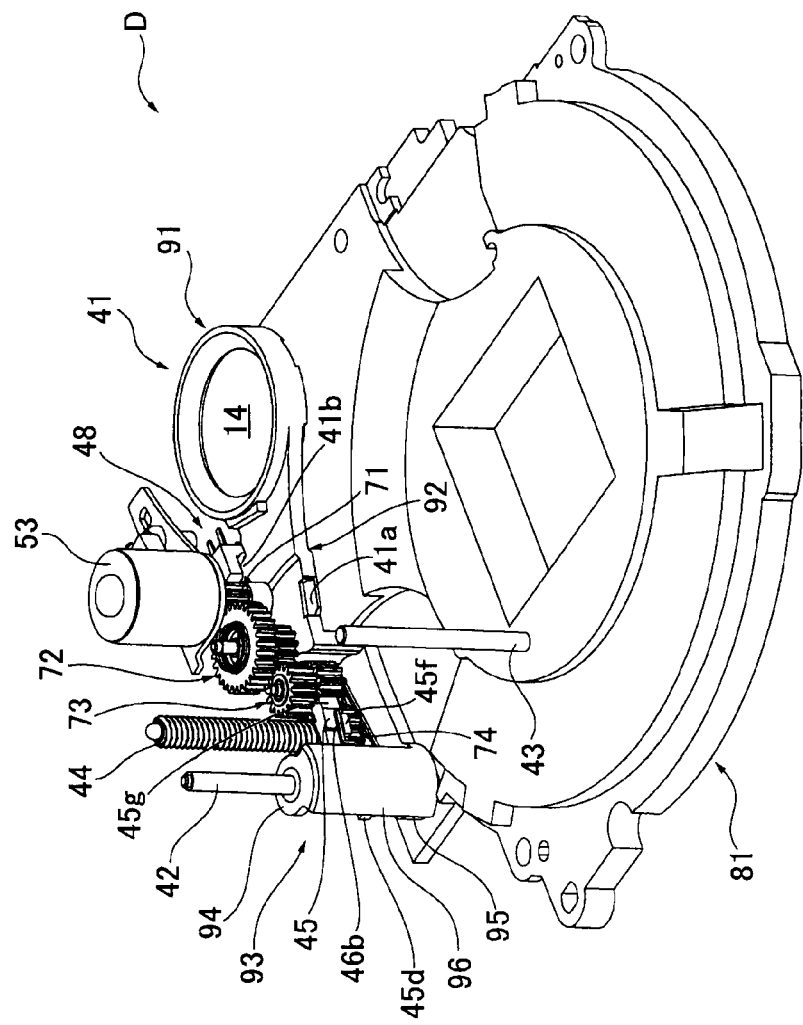
FIG. 10 is a perspective view for explaining a configuration of a fourth lens retaining frame and a driving mechanism thereof and schematically showing the configuration in the collapsed stored state.
Figure 11:
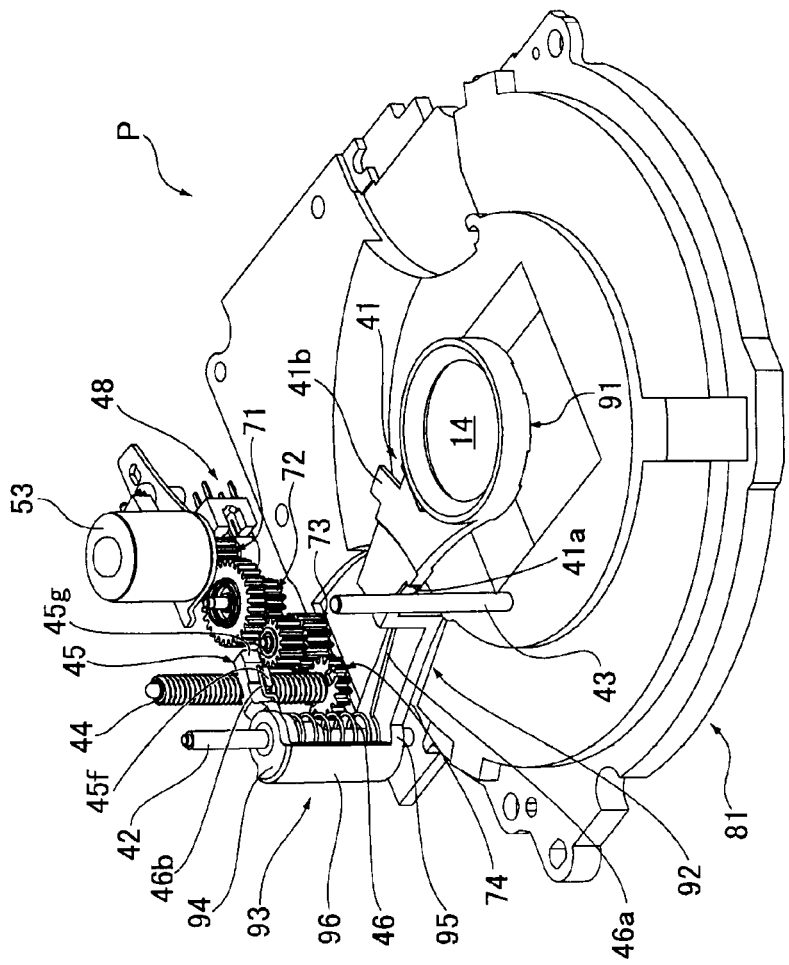
FIG. 11 is an explanatory view for explaining a configuration of the fourth lens retaining frame and the driving mechanism and showing the configuration in the photographic state P.
Figure 13:
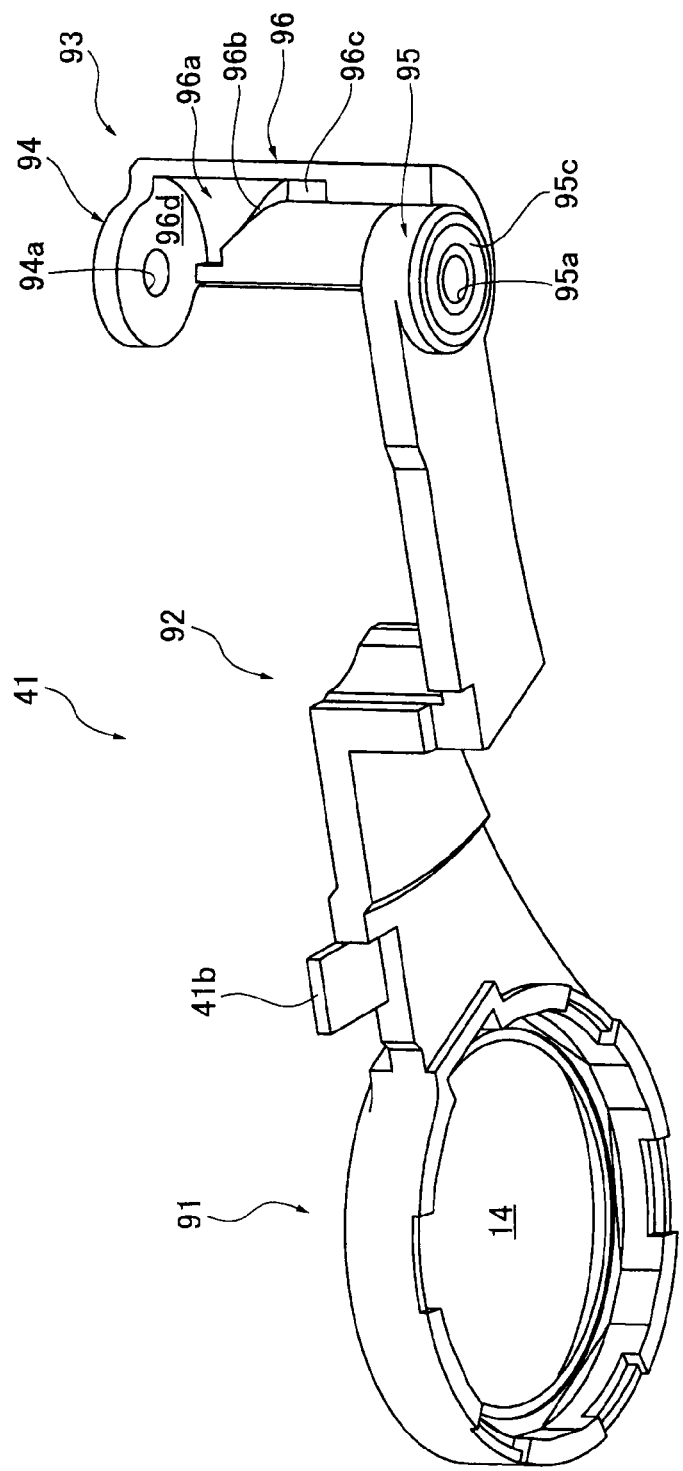
FIG. 13 is a schematic perspective view explaining the configuration of the fourth lens retaining frame.
Figure 14:
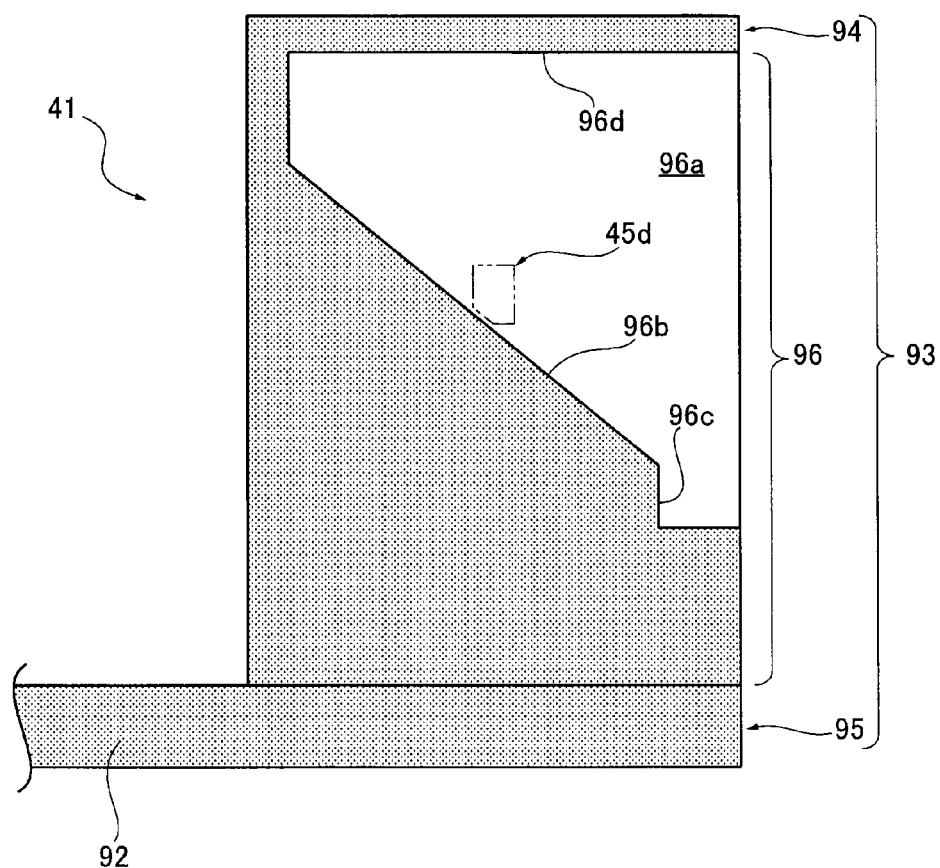
FIG. 14 is an explanatory view for explaining a configuration of a stepped portion of a connection wall portion of a fourth lens retaining frame turning base portion of the fourth lens retaining frame.
Figure 15:
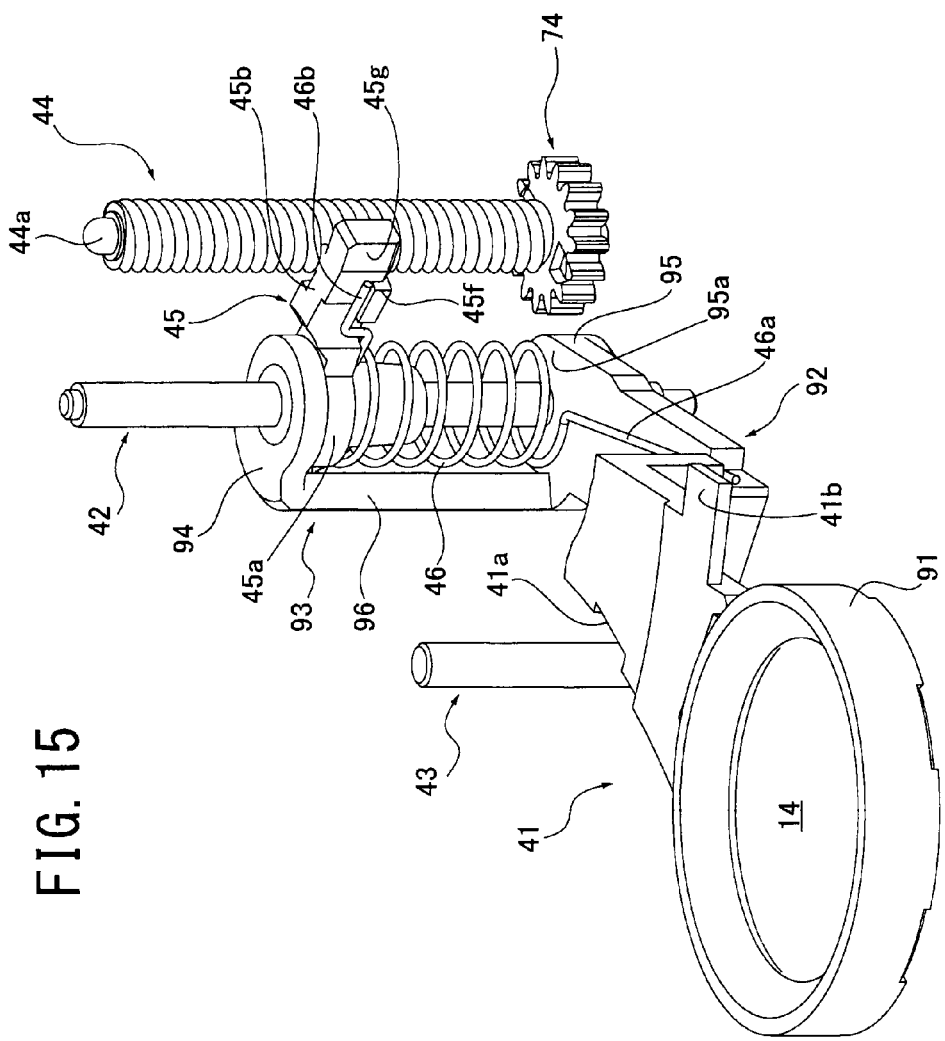
FIG. 15 is a schematic perspective view for explaining a configuration of periphery of the fourth lens retaining frame.

More specifically, configuration of the fourth lens retaining frame 41 and the driving mechanism thereof will be explained. The driving mechanism of the fourth lens retaining frame 41 (for the fourth lens group 14) has, as shown in FIGS. 10 to 21, corresponding to the fourth lens retaining frame 41 retaining the fourth lens group 14, a fourth group main guide shaft 42, a fourth group sub guide shaft 43, a fourth group lead screw 44, a screw member (rack) 45, a compression torsion spring 46, a screw biasing piece 47 (see FIGS. 1 and 12), a sliding wall portion 49 (see FIG. 18), a fourth group motor 53 and gears 71 to 74. In FIGS. 10, 11 and 15, the sliding wall portion 49 is omitted for sake of simplicity. In FIG. 14, further, for sake of easy understanding, dots are added to parts other than a stepped part 96a in an inner wall surface of a later-described connection wall part 96.

The fourth lens retaining frame 41 has one end retaining the fourth lens group 14 and another end in which the fourth group main guide shaft 42 is inserted to be rotatably and silidably moved. As shown in FIG. 13, the fourth lens retaining frame 41 has a fourth lens retaining portion 91, a fourth lens retaining frame arm portion 92, and a fourth lens retaining frame turning base portion 93.

The fourth lens retaining portion 91 is positioned at an end side (leading end side) in the fourth lens retaining frame 41 and retains the fourth lens group 14. The fourth lens retaining portion 91 is a frame member having an entirely cylindrical shape.

The fourth lens retaining frame arm portion 92 connects the fourth lens retaining portion 91 and the fourth lens retaining frame turning base portion 93 and constitutes an arm portion in the fourth lens retaining frame 41. The fourth lens retaining frame arm portion 92 has an entirely crank-shaped bent portion, which extends in a direction parallel to the fourth group main guide shaft 42 at a middle position. Next to the fourth lens retaining frame arm portion 92, at another end side, the fourth lens retaining turning base portion 93 is connected.

The fourth lens retaining frame turning base portion 93 has a discoid front axis fitting portion 94 and a discoid rear axis fitting portion 95 which have respectively insertion holes (94a, 95a) on a same axis each other, and a connection wall portion 96 connecting the portions 94, 95 each other so as to form a substantially cylindrical space between the portions 94, 95. The insertion hole of the front axis fitting portion 94 and the insertion hole 95 of the rear axis fitting portion 95 are through-holes permitting the fourth group main guide shaft 42 to be inserted in the through holes and capable of relatively moving to each other. The fourth lens retaining frame arm portion 92 is connected to the rear axis fitting portion 95. The connection wall portion 96 has a curved cylindrical shape about the axis line of the insertion holes 94a and 95a which is equal to the axis line of the fourth group main guide shaft 42) as viewed on a plane perpendicular to the axis line (see FIG. 18).

On an inner wall surface of the connection wall portion 96, a stepped portion 96a which is concave from the cylinder inner circumferential surface is provided. The stepped portion 96a has, as shown in FIG. 14, a cam surface 96b having a cam inclined shape at a base end side, a side engagement surface 96c connected from a lower end of the cam surface 96b and extending in the direction of the photographic optical axis OA, and a front engagement surface 96d formed by a lower end surface of the front axis fitting portion 94 and in a plane substantially perpendicular to the photographic optical axis.

The fourth lens retaining frame turning base portion 93 is supported by the fourth group main guide shaft 42 rotatably about an axis line of the fourth group main guide shaft 42 and movably in the direction of the photographic optical axis OA (see FIG. 15) through the insertion hole 94a of the front axis fitting portion 94 and the insertion hole 95a of the rear axis fitting portion 95 via the connection wall portion 96.

Figure 12:
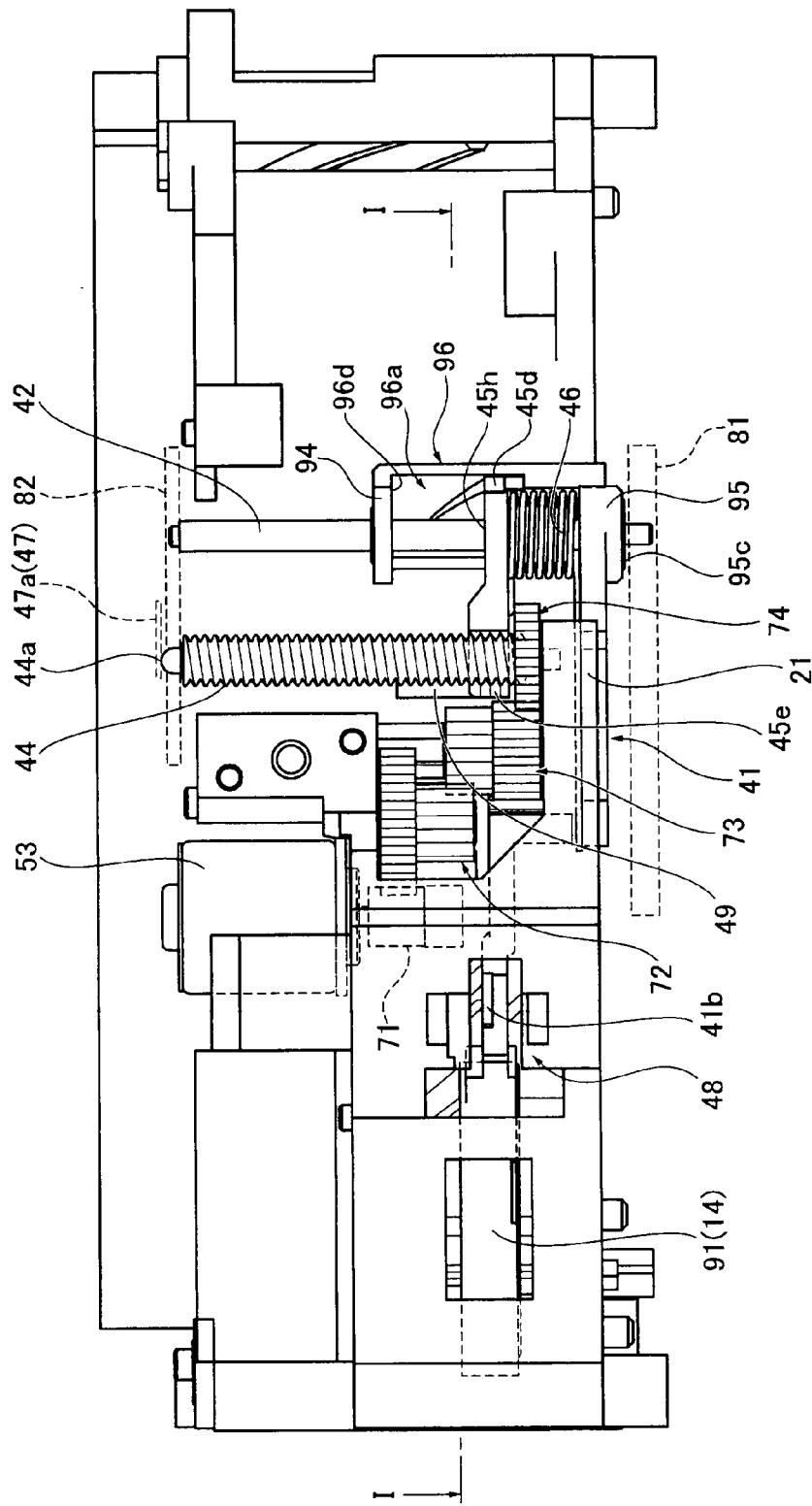
FIG. 12 is a side view schematically showing the lens barrel viewed in a direction of arrow A3 of FIG. 2.

The fourth group main guide shaft 42 is provided substantially parallel to the photographic optical axis OA and is sandwiched and supported between the lens barrel base 81 and the pressing plate 82, which are fixed on the fixed frame 21 so as to have an interval with each other in the direction of the photographic optical axis OA (see FIGS. 1 and 12). Accordingly, the fourth lens retaining frame 41 is appropriately turned about the fourth group main guide shaft 42 so as to be moved and rotated between the stored position (collapsed stored state D) where the fourth lens group 14 is stored in the storing space 21Q of the fixed frame 21 in the collapsed stored state, that is, retracted out of the fixed cylinder 21a, as shown in FIGS. 2 and 10, and the photographic position (photographic state P) where the fourth lens group 14 is positioned on the photographic optical axis OA (photographic light path) in the photographic state, as shown in FIGS. 3 and 11. The fourth lens retaining frame 41 is appropriately moved along the fourth group main guide shaft 42 in the photographic position (photographic state P), so that the fourth lens group 14 positioned on the photographic optical axis OA can be moved on the photographic optical axis OA (as a linear motion).

In the fourth lens retaining frame 41, a stopper 41a (see FIGS. 10 and 11) and a light shielding piece 41b are formed to be projected on the fourth lens retaining frame arm portion 92 at a vicinity of a bent portion thereof at a side of the fourth lens retaining portion 91. The stopper 41*a* is provided at a front side in a turning direction from the collapsed position (storing space 21Q) to the photographic position (on the photographic optical axis OA), as shown in FIGS. 10 and 11. The stopper 41*a* comes in contact with the fourth group sub guide shaft 43 to position the fourth lens group 14 retained by the fourth lens retaining frame 41 on the photographic optical axis OA (photographic position). The fourth group sub guide shaft 43 has a rod-like shape and is provided on the lens barrel base 81 so as to extend in the photographic optical axis OA. Therefore, the fourth group sub guide shaft 43 is provided substantially parallel to the photographic optical axis OA and has a function of positioning the fourth lens group (the fourth lens retaining frame 41) to a position on the photographic position (on the photographic optical axis OA) in corporation with the stopper 41*a* and the compression torsion spring 46.

The light shielding piece 41*b* is formed so as to extend in a plate-like form to detect whether or not the fourth lens retaining frame 41 (the fourth lens group 14) is positioned on the stored position. The light shielding piece 41*b* shields a detecting portion of the photointerruptor 48 as a fourth group position detector from light when the fourth lens retaining frame 41 is positioned at the stored position (see FIGS. 2 and 10), and deviates from the detecting portion of the photointerruptor 48 when the fourth lens retaining frame 41 is positioned at the photographic position (see FIGS. 3 and 11). The photointerruptor 48 is configured to output a reference signal of L (low level) when the detecting portion is shielded from light by the light shielding piece 41*b* and output a reference signal of H (high level) when the detecting portion is not shielded from light by the light shielding piece 41*b*. Accordingly, if the L (low level) reference signal is output, it is assumed that the fourth lens retaining frame 41 reaches the stored position and therefore it is possible to start retracting operation in which the third lens retaining frame 31 which is positioned at the object side of the fourth lens retaining frame 41 is retracted to the stored position. The fourth lens retaining frame 41 receives a driving force from the fourth group lead screw 44 to be rotated and linearly moved.

The fourth group lead screw 44 has, as shown in FIGS. 12 and 15, a rod-like shape and a screw groove on an outer circumferential surface thereof. A gear 74 is integrally fixed to an image plane side end of the fourth group lead screw 44. The fourth lead screw 44 is sandwiched between the pressing plate 82 and the fixed frame 21 so as to be rotatably supported in a substantially parallel state to the photographic optical axis OA. An end 44*a* of the fourth group lead screw 44 is projected from the pressing plate 82 toward the object side and receives a biasing force toward the image plane side by the arm portion 47*a* of the screw biasing piece 47 (see FIG. 1). The screw biasing piece 47 is fastened with the pressing plate 82 to be fixed to the fixed frame 21 (see FIG. 1). Therefore, in the fourth group lead screw 44, backlash in the direction of the photographic optical axis OA is displaced to one side. The fourth group lead screw 44 is driven to be rotated by transmitting the turning driving force from the gear 71 provided on the output shaft of the fourth group motor 53 via the gears 72 and 73 to the gear 74. The screw member 45 is provided for transmission of the turning driving force to the fourth lens retaining frame 41.

Figure 16:
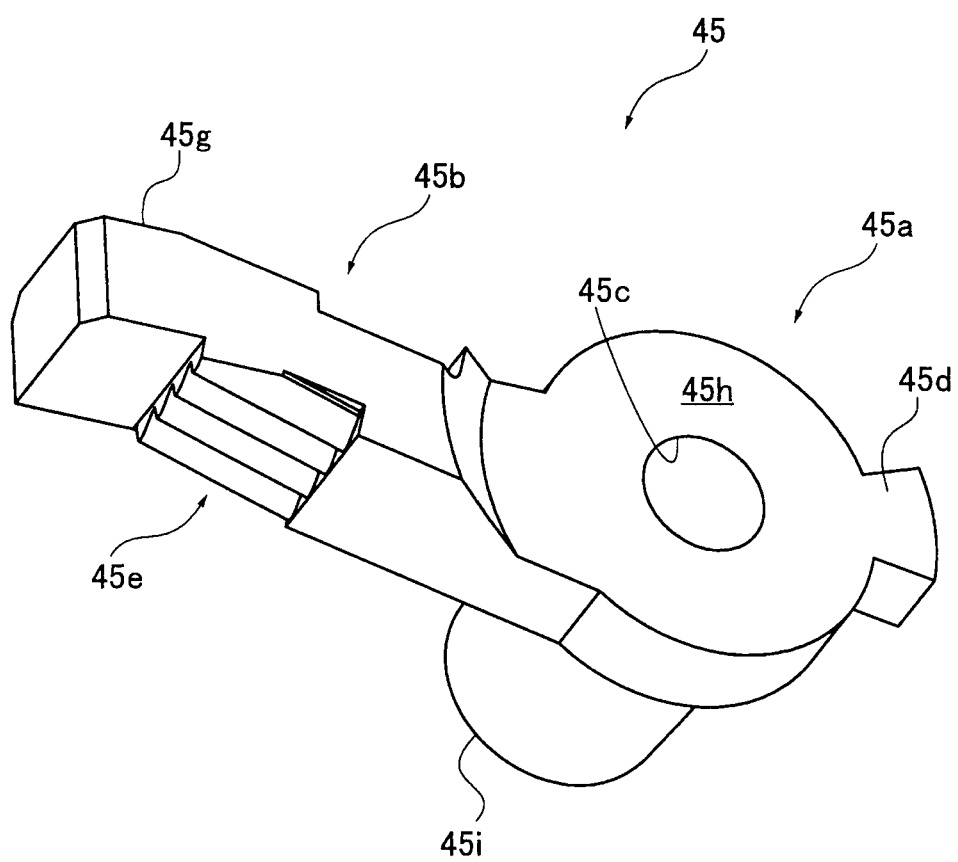
FIG. 16 is a schematic perspective view for explaining a configuration of a screw member.

The screw member (rack) 45 has, as shown in FIG. 16, a cylindrical insertion base portion 45*a* and a columnar engagement leg portion 45*b* extending from the insertion base portion 45*a*. The insertion base portion 45*a* has a through hole 45*c* into which the fourth group main guide shaft 42 is inserted movably relative to the fourth group main guide shaft 42, and a contact portion 45*d* projected at an opposite side of the engagement leg portion 45*b*. The engagement leg portion 45*b* has a rack portion 45*e* on which a plurality of teeth capable of being screwed with screw grooves of the fourth group lead screw 44 are formed, an engagement projection portion 45*f* (see FIG. 15) configured to fix another arm portion 46*b* of the compression torsion spring 46, and a sliding contact surface 45*g* positioned at a rear side of the rack portion 45*e* in the engagement leg portion 45*b*.

The screw member 45 is, as shown in FIG. 15, provided with the insertion base portion 45*a* positioned in a space (inner position of the connection wall portion 96) between the front axis fitting portion 94 in the fourth lens retaining frame turning base portion 93 of the fourth lens retaining frame 41 and the rear axis fitting portion 95, and with the fourth group main guide shaft 42 inserted into the through hole 45*c*. Therefore, the screw member 45 is supported rotatably about the fourth group main guide shaft 42 and movably along the fourth group main guide shaft 42 in the inner position of the connection wall portion 96 so that it is possible to rotate and move relative to the fourth lens retaining frame 41. The upper surface 45*h* of the insertion base portion 45*a* of the screw member 45 faces the lower end surface of the front axis fitting portion 94, that is, the front engagement surface 96*d* (see FIG. 14) of the stepped portion 96*a* formed on inner wall surface of the connection wall portion 96. The contact portion 45*d* is positioned inside the stepped portion 96*a* (see FIG. 12) formed on the inner wall surface of the connection wall portion 96 (see FIG. 19). Accordingly, the contact portion 45*d* of the screw member 45 is capable of being engaged with the cam surface 96*b* of the stepped portion 96*a*, the side engagement surface 96*c*, and the front engagement surface 96*d* (see FIG. 20). The compression torsion spring 46 is provided at a lower side of the screw member 45 (a side of the rear axis fitting portion 95).

The compression torsion spring 46 is disposed so as to surround a periphery of the fourth group main guide shaft 42 in the space (inner position of the connection wall portion 96) between the front axis fitting portion 94 and the rear axis fitting portion 95 in the fourth lens retaining frame 41. The one arm portion 46*a* of the compression torsion spring 46 is fixed on the fourth lens retaining frame arm portion 92 of the fourth lens retaining frame 41 and the other arm portion 46*b* is fixed on the engagement projection portion 45*f* of the engagement leg portion 45*b* of the screw member 45. Therefore, the compression torsion spring 46 is configured to continuously bias (also referred to as linearly bias, hereinafter) the screw member 45, in the space between the front axis fitting portion 94 and the rear axis fitting portion 95 in the fourth lens retaining frame 41 (inner position of the connection wall portion 96), in a direction from the image plane side (side of the rear axis fitting portion 95) to the object side (side of the front axis fitting portion 94), that is, a front direction (toward an upper side of FIG. 19 viewed from a front side) on the fourth group main guide shaft 42 (in the direction of the photographic optical axis OA). The compression torsion spring 46 is also configured to continuously bias (also referred to as rotatably bias) the fourth lens retaining frame 41 and the screw member 45 so as to be separated from each other in the rotational direction about the fourth group main guide shaft 42. In the screw member 45 rotatably biased by the compression torsion spring 46, the rack portion 45*e* positioned at the front side in the biased rotational direction is screwed with the screw groove of the fourth group lead screw 44.

Figure 17:
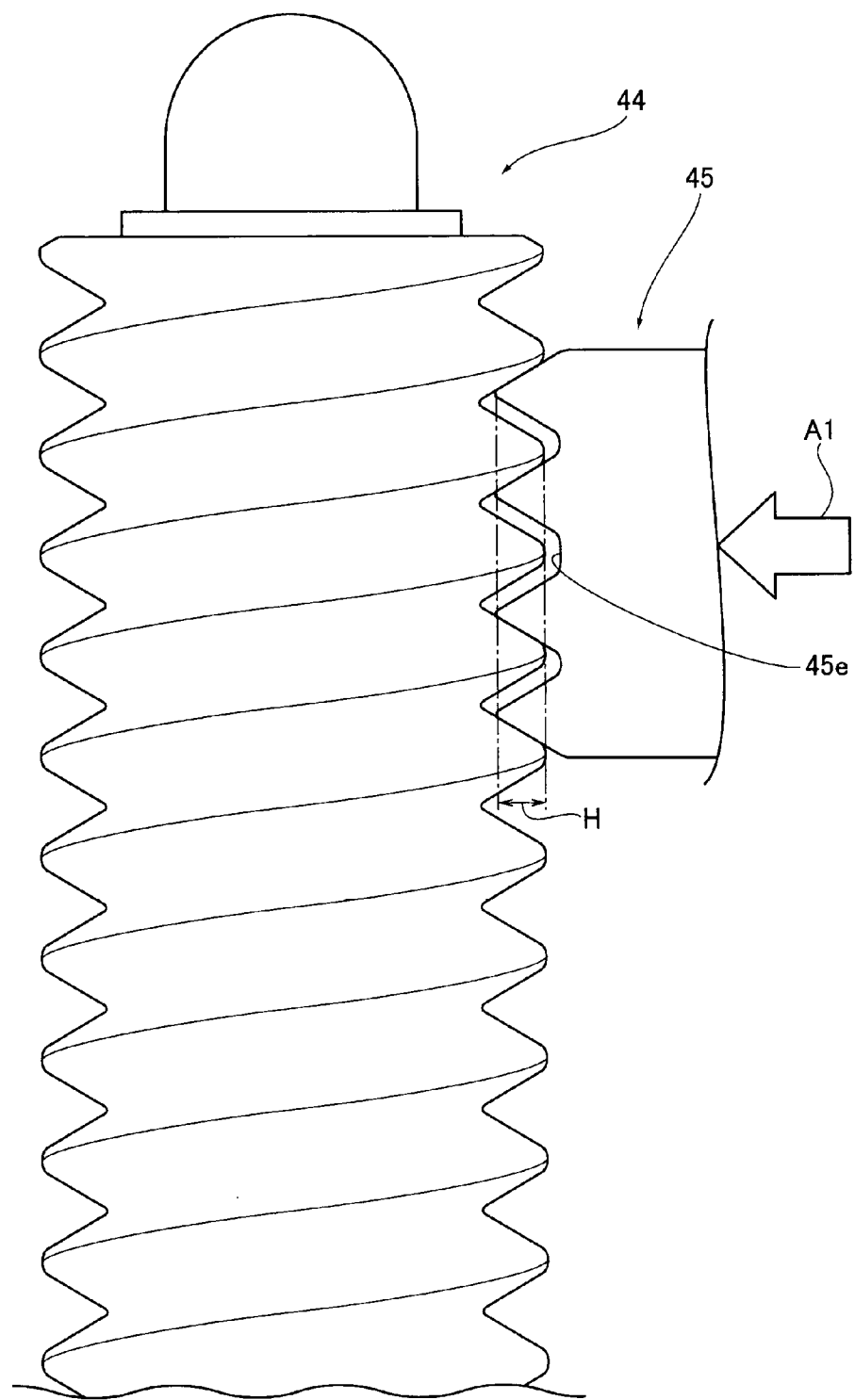
FIG. 17 is an explanatory view showing a state where a rack portion (screw groove thereof) of the screw member is appropriately screwed with a fourth group lead screw (screw groove thereof).

The rack portion 45e of screw member 45 is capable of being screwed with the screw groove of the fourth group lead screw 44, as described above. In this embodiment, as shown in FIG. 17, the rack portion 45e is configured to come into contact with the screw groove of the fourth group lead screw 44 at both of the object side surface (upper side in FIG. 17) and the image plane side surface (lower side in FIG. 17). Therefore, the screw member 45 is pressed onto the fourth group lead screw 44 (or the screw groove thereof) (see arrow A1) and then the rack portion 45e (or the screw groove thereof) is screwed with the fourth group lead screw 44 (the screw groove thereof) in an appropriate state where backlashes in the photographic optical axis direction and a direction perpendicular to the photographic optical axis direction are removed. In other words, the screw member 45 is pressed onto the fourth group lead screw 44 (the screw groove thereof) (see arrow A1) and thereby the rack portion 45e (the screw groove thereof) comes into contact with the screw groove of the fourth group lead screw 44 at both of the front and rear sides in a moved direction of the screw member 45 moved along the fourth group lead screw 44. The sliding wall portion 49 (see FIG. 18) is provided for holding the screwed state.

Figure 18:
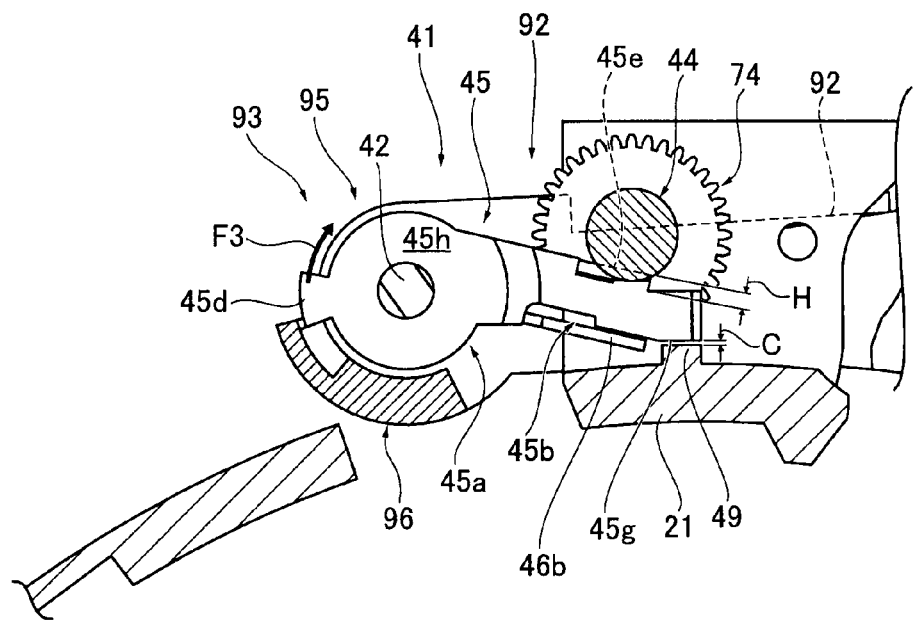
FIG. 18 is an explanatory view showing a configuration of periphery of the fourth group lead screw as a section obtained along I-I line of FIG. 12.

The sliding wall portion 49 faces, as shown in FIG. 18 which is a sectional view along I-I line of FIG. 12, the sliding contact surface 45g of the screw member 45 in a direction perpendicular to the photographic optical axis OA. In other words, the screw member 45 is, as viewed in a plane perpendicular to the photographic optical axis OA, positioned between the fourth group lead screw 44 and the sliding wall portion 49. The sliding wall portion 49 extends out at the object side from the fixed frame in the direction of the photographic optical axis and has a dimension of at least a length capable of facing the sliding contact surface 45g of the screw member 45 positioned at a height (see FIG. 12) where a later-described contact side portion 45u of the contact portion 45d comes into contact with the cam surface 96b, that is, positioned between later-described height positions R1 and Rh (see FIG. 21). Furthermore, the sliding wall portion 49 is positioned such that an interval C between the sliding wall portion 49 and the sliding contact surface 45g is smaller than an engagement amount H (see FIG. 17) of the rack portion 45e and the fourth group lead screw 44 (H>C) in a state where the rack portion 45e (screw groove thereof) of the screw member 45 is appropriately screwed with the fourth group lead screw 44 (screw groove thereof).

Next, operation when the fourth lens retaining frame 41 configured as described above is turned between the collapsed position (collapsed stored state D) where the fourth lens group 14 is retracted out of the fixed cylinder 21a of the fixed frame 21 and the photographic position (photographic state P) where the fourth lens group 14 is inserted and positioned on the photographic optical axis OA by the above-described driving mechanism.

In the fourth lens retaining frame 41 (that is, the driving mechanism thereof), by sliding the cam surface 96b of the stepped portion 96a provided on the inner surface of the cylindrical fourth lens retaining frame turning base portion 93 and the contact portion 45d of the screw member 45, which is received in the corn surface 96b, the fourth lens retaining frame turning base portion 93 receives a pressing force of the screw member 45 linearly moved in front and back directions to be rotated. Then, by the contact portion 45d coming into contact with the front engagement surface 96d, the fourth lens retaining frame turning base portion 93 receives the pressing force of the screw member 45 linearly moved in front and back directions to be linearly moved (see FIG. 19). Therefore, the stepped portion 95a functions as a cam groove and the contact portion 45d of the screw member 45 functions as a cam pin. Thereby, the stepped portion 96a and the contact portion 45d constitutes a cam structure configured to convert the linear motion of the screw member 45 into a rotary motion about the fourth group main guide shaft 42 in the fourth lens retaining frame 41 and a linear motion along the fourth group main guide shaft 42. FIGS. 20A to 20C are plane views schematically showing the stepped portion 96a as the cam groove as viewed in the rotational direction of the fourth lens retaining frame turning base portion 93, more particularly, FIG. 20A indicates a state of a retracting start position B (see FIG. 19), FIG. 20B a transitional state between the retracting start position B and a stored position S (see FIG. 19), and FIG. 20C a state of the stored position S. FIG. 20 shows a rotated state of the fourth lens retaining frame turning base portion 93 by moving the stepped portion 96a right and left, and shows a linear motion of the contact portion 45d as the cam pin in the front and back directions along the fourth group lead screw 44 by movement in upper and lower directions as viewed from a front side.

The fourth lens retaining frame turning base portion 93 is, as described above, by the contact portion 45d of the screw member 45 as the cam pin moved in the front and back directions in the stepped portion 96a as the cam groove, moved upwardly and downwardly along the fourth group main guide shaft 42 and rotatably moved about the fourth group main guide shaft 42. Operation of the fourth lens retaining frame turning base portion 93 relative to the position of the contact portion 45d in the stepped portion 96a as the cam groove will be explained.

The driving mechanism of the fourth lens retaining frame 41 is, as described above, configured such that, by the rotational biasing of the compression torsion spring 46, the fourth lens retaining frame 41 (the fourth lens retaining frame arm portion 92) fixed to the one arm portion 46a of the compression torsion spring 46 receives a rotational biasing force in the rotational direction so as to allow the stopper 41a to come into contact with the fourth group sub guide shaft 43 and the screw member 45 (the engagement leg portion 45b) fixed to the other arm 46b receives rotational biasing force in the rotational direction so as to allow the rack portion 45e (screw groove thereof) to be screwed with the fourth group lead screw 44 (screw groove thereof). Therefore, in the stepped portion 96a of the connection wall portion 96 of the fourth lens retaining frame turning base portion 93 of the fourth lens retaining frame 41, the rotational biasing force about the fourth group main guide shaft 42 relative to the contact portion 45d of the screw member 45 which is positioned inside the stepped portion 96a and moved along the photographic optical axis OA, that is, relatively rotational force between the contact portion 45d and the stepped portion 96a (connection wall portion 96) acts. In FIGS. 20A to 20C, a direction where the stepped portion 96a (connection wall portion 96) is rotationally biased by the compression torsion spring 46 is shown by arrow A2.

In the driving mechanism of the fourth lens retaining frame 41, due to the above described configuration, length in the linearly biasing direction is set in a compression state (state where the compression torsion spring is compressed from a natural length against a linearly biasing) in the compression torsion spring 46 for a positional relationship between a substantially cylindrical shaped space of the fourth lens retaining frame turning base portion 93 of the fourth lens retaining frame 41 and the screw member (insertion base portion 45a thereof). Thereby, the compression torsion spring 46 disposed between the rear axis fitting portion 95 (upper end surface 95 thereof) of the fourth lens retaining frame 41 (fourth lens retaining frame turning base portion 93) fixed to the one arm portion 46a of the compression torsion spring 46 and the insertion base portion 45a (lower end surface 45i thereof) of the screw member 45 fixed to the other arm portion of the compression torsion spring 46 is compressed in the extending direction of the fourth group main guide shaft 42 (photographic optical axis direction). Therefore, the fourth lens retaining frame turning base portion 93 (upper end surface 95b of the rear axis fitting portion 95) is pressed to the image plane side (lower side of FIG. 19) relative to the screw member 45 (lower end surface 45i of the insertion base portion 45a) moved along the photographic optical axis OA by linearly biasing of the compression torsion spring 46.

Figure 19:
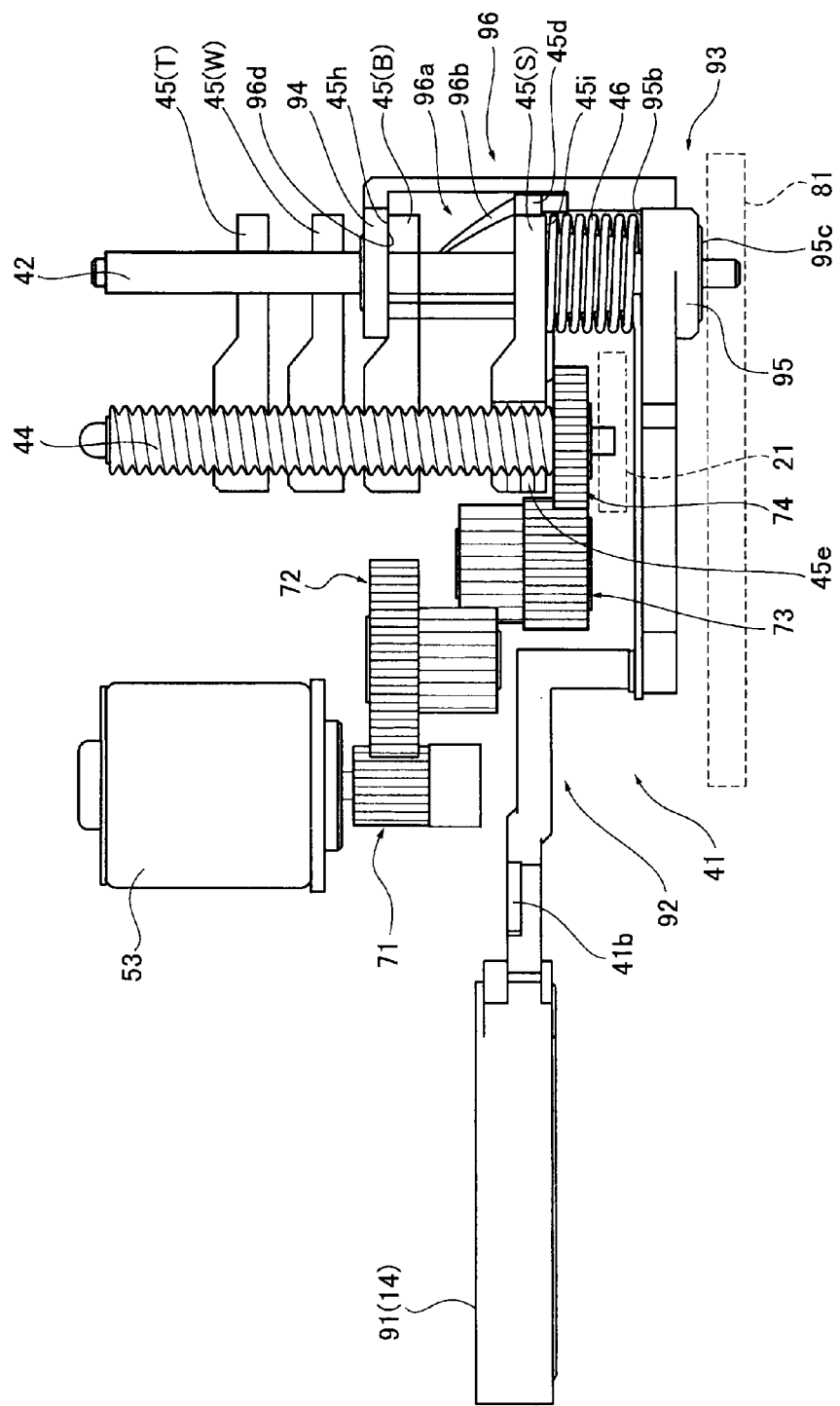
FIG. 19 is an explanatory view for explaining operations of the fourth lens retaining frame and driving operation system.
Figure 20A:
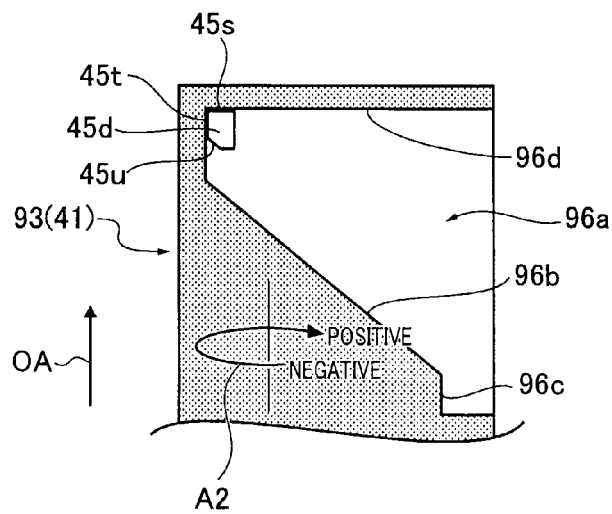
FIG. 20A is an explanatory view for explaining operation of the screw member in the stepped portion in an embodiment in a state where a cam pin (contact portion) is positioned at a retracting start position.
Figure 20B:
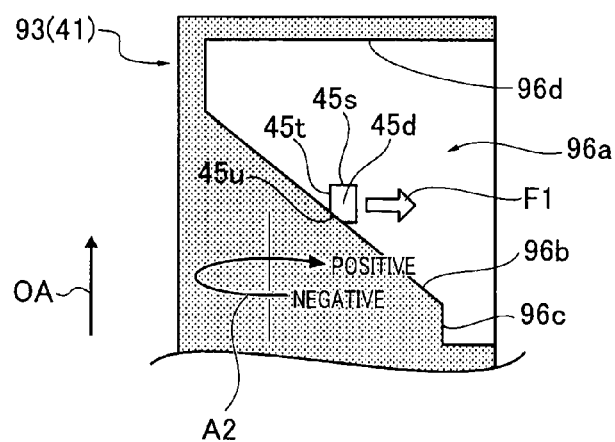
FIG. 20B is an explanatory view for explaining operation of the screw member in the stepped portion in the embodiment in a transition state where the cam pin (contact portion) is between the retracting start position and the stored position.
Figure 20C:
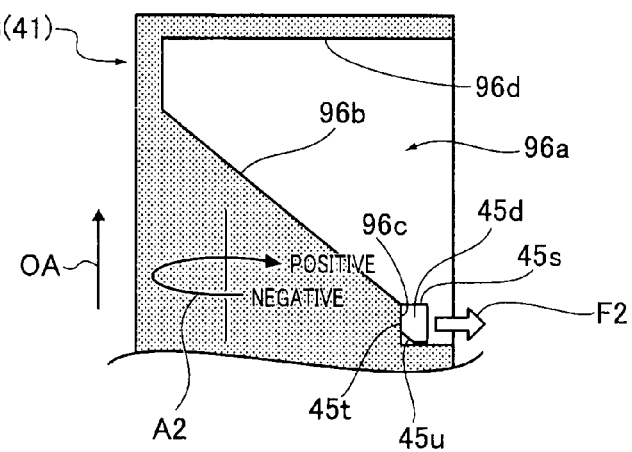
FIG. 20C is an explanatory view for explaining operation of the screw member in the stepped portion in the embodiment in a state where the cam pin (contact portion) is positioned at the stored position.

If the contact portion 45d is, as shown in FIG. 20A, moved toward a front side (object side and upper side in FIG. 20A) than a position where the cam surface 96b does not exist, that is, the retracting start position B (see FIG. 19), as described below, a force for compressing the compression torsion spring 46 so as to reduce an interval between the one arm portion 46a and the other arm portion 46b against the rotational biasing force of the compression torsion spring 46 by engagement of the contact portion 45d and the cam surface 96b. Therefore, in the compression torsion spring 46, the fourth lens retaining frame 41 fixed to the one arm portion 46a and the screw member 45 fixed to the other arm portion 46b are disposed separately from each other in the rotational direction about the fourth group main guide shaft 42. Here, the length in the rotational biasing direction in the compressed state where the compression torsion spring 46 is compressed against the rotational biasing from the natural length relative to the position relationship among the fourth group main guide shaft 42, the fourth group sub guide shaft 43, and the fourth group lead screw 44 is set. Thereby, the stopper 41a of the fourth lens retaining frame 41 (the fourth lens retaining frame arm portion 92) fixed to the one arm portion 46a comes into contact with the fourth group sub guide shaft 43 and is pressed thereon and the rack portion 45e (screw groove thereof) of the screw member 45 (engagement leg portion 45b thereof) fixed to the other arm portion 46b is pressed on the fourth group lead screw 44 (screw groove thereof). Accordingly, if the contact portion 45d is moved toward the front side than the cam surface 96b, by the rotational biasing of the compression torsion spring 46, the fourth lens group 14 retained by the fourth lens retaining frame 41 coming into contact with the fourth group sub guide shaft 43 is positioned on the photographic optical axis OA by the stopper 41a and the rack portion 45e (screw groove thereof) of the screw member 45 is pressed on the fourth group lead screw 44 to be appropriately screwed therewith. Therefore, the compression torsion spring 46 has a function as a screw member pressing device configured to press the screw member 45 onto the fourth group lead screw 44 so as to allow the screw member 45 to come into contact with the fourth group lead screw 44 in a direction perpendicular to the axis line of the fourth group lead screw 44. Furthermore, the compression torsion spring 46 has a function as a retaining frame rotationally biasing device configured to rotationally bias the fourth lens retaining frame 41 toward the fourth group sub guide shaft 43 so as to allow the fourth lens retaining frame 41 as the retractable lens retaining frame to come into contact with the fourth group sub guide shaft 43 as the positioning member in the rotational direction about the fourth group main guide shaft 42.

if the contact portion 45d is, as shown in FIG. 20A, moved toward the front side, that is, to the position where the cam surface 96b does not exist (retracting start position B as shown in FIG. 19), and further moved toward the front side, for example, a wide angle position W or a telephoto position T, or the like in the screw member 45 (see FIG. 19), the upper surface 45s of the contact portion 45d (upper end surface 45h of the screw member 45) comes into contact with the front engagement surface 96d. At this time, the fourth lens retaining frame base portion 93 is rotationally biased in the direction of arrow A2 against the contact portion 45d by the compression torsion spring 46, and therefore, the contact portion 45d (upper surface 45s thereof) comes into contact with the front engagement surface 96d at the left end portion of the drawings. In this state, as described above, the fourth lens group 14 is positioned on the photographic optical axis OA (see FIG. 8) and the rack portion 45e (screw groove thereof) of the screw member 45 is pressed on the fourth group lead screw 44 (screw groove thereof). In this state, the fourth lens retaining frame turning base portion 93 of the fourth lens retaining frame 41 is linearly biased toward the image plane surface side (lower side of FIG. 19) against the screw member 45 by the compression torsion spring 46. Accordingly, the front engagement surface 96d (lower end surface of the front axis fitting portion 94 as shown in FIG. 19) of the connection wall portion 96 of the fourth lens retaining frame turning base portion 93 is pressed on the upper end surface 45h of the screw member 45 so that it is possible to move the screw member 45 together with the fourth lens retaining frame turning base portion 93 (fourth lens retaining frame 41). Therefore, the compression torsion spring 46 has a function as a retaining frame linearly biasing device configured to press the screw member 45 and the fourth lens retaining frame 41 in the direction along the fourth group main guide shaft 42 so as to move the fourth lens retaining frame 41 as the retractable lens retaining frame along the fourth group main guide shaft 42 together with the screw member 45 moved along the fourth group main guide shaft 42.

In this state, if the contact portion 45d is further moved toward the front side (for example, toward the wide angle position W or the telephoto position T of the screw member 45 as shown in FIG. 19), the contact portion 45d (upper surface 45s, that is, the upper end surface 45h of the screw member 45) presses the front engagement surface 96d toward the front side to press the fourth lens retaining frame turning base portion 93, that is, the fourth lens retaining frame 41 toward the front side. Accordingly, as described above, the fourth lens group 14 is appropriately moved toward the object side. That is, the fourth lens retaining frame 41 is gradually moved from the image plane side toward the object side while keeping a state where the fourth lens group 14 is positioned on the photographic optical axis OA by rotationally biasing of the compression torsion spring 46 and control of the fourth group sub guide shaft 43.

If the contact portion 45d is moved from the telephoto position T (see FIG. 19) toward the rear side (image plane side and lower side of FIG. 20), the fourth lens retaining frame 41 is moved together with the moved contact portion 45d toward a side of the lens barrel base 81. Accordingly, the fourth lens group 14 is appropriately moved toward the image plane side on the photographic optical axis OA. The movement of the fourth lens retaining frame 41 together with the contact portion 45d is performed from a state where the contact portion 45d is positioned at the telephoto position T to a state where the lower end surface 95c of the rear axis fitting portion 95 of the fourth lens retaining frame turning base portion 93 of the fourth lens retaining frame 41 comes into contact with the lens barrel base 81 (upper surface thereof). As described above, in the above described cam structure, the contact portion 45d and the front engagement surface 96d constitute a linear motion portion (cam structure linear motion device) configured to convert the movement of the screw member 45 into linear motion of the fourth lens retaining frame 41 along the fourth group main guide shaft 42.

If the contact portion 45*d* is, as shown in FIG. 20B, moved from the retracting start position B (see FIG. 19) toward the rear side (image plane side and lower side of the drawing), the contact side portion 45*u* positioned at the lower end of the side surface 45*t* comes into contact with the cam surface 96*b* to be pressed toward the rear side. In this state, the pressing of the front engagement surface 96*d* by the contact portion 45*d* (upper surface 45*s*, that is, the upper end surface 45*h* of the screw member 45) is released and therefore by the linearly biasing from the compression torsion spring 46 based on the lower end surface 45*i* of the contact portion 45*d* as a reference, the base end surface (lower end surface 95*c* of the rear axis fitting portion 95) of the fourth lens retaining frame 41 comes into contact with the lens barrel base 81 (see FIG. 19). Therefore, the in the fourth lens retaining frame 41, the fourth lens retaining frame turning base portion 93 is rotated against the rotational biasing force of the compression torsion spring 46 (moving toward a left side of FIG. 20B), so as to comply with a cam trajectory of the cam surface 96*b* with which the contact portion 45*d* (contact side portion 45*u*) comes into contact, in accordance with the position of the contact portion 45*d* (height position of FIG. 20B) moved along the fourth group lead screw 44. Thereby, the fourth lens retaining frame turning base portion 93, that is, the fourth lens retaining frame 41 is in a transition state where the fourth lens retaining frame 41 is rotated toward the retracted position and the fourth lens group 14 is in a transition state where the fourth lens group 14 is retracted from the photographic optical axis OA to the retracted position. As described above, in the retracting transition state, by the cam structure in that the contact portion 45*d* of the screw member 45 moved along the fourth group lead screw 44 is engaged with the cam surface 96*b* of the fourth lens retaining frame 41, the compression force for reducing the interval between the one arm portion 46*a* and the other arm portion 46*b* against the rotational biasing force of the compression torsion spring 46 affects the compression torsion spring 46. As described above, in the above described cam structure, the contact portion 45*d* and the cam surface 96*b* constitute the rotation device (cam structure rotation device) configured to convert the movement of the screw member 45 into the rotary motion of the fourth lens retaining frame 41 about the fourth group main guide shaft 42.

If the contact portion 45*d* is, as shown in FIG. 20C, moved rearward to the stored position S, that is, the position where the cam surface 96*b* does not exist, the fourth lens retaining frame turning base portion 93 is biased in the direction of arrow A2 so that the side surface 45*t* comes into contact with the side engagement surface 96*c* to be pressed each other. In this state, each position is set such that the fourth lens group 14 is positioned to the storing space 21Q (stored position) (see FIGS. 2 and 10). When, as described above, the fourth lens retaining frame 41 approaches the storing space 21Q (stored position), the light shielding piece 41*b* of the fourth lens retaining frame 41 shields the detection portion of the photointerrptor 48 as the position detector for the fourth lens group 14 (see FIGS. 2 and 10), so that the photointerruptor 48 outputs the reference signal from H (high level) to L (low level). The fourth lens retaining frame 41, that is, the fourth lens group 14 is controlled to be positioned by pulse counting by use of the reference signal from the photointerruptor 48 as a reference. In the photointerruptor 48, the reference signal from H to L is a storing reference signal. The storing position S of the fourth lens retaining frame 41 is a position which is moved to the image side by a predetermined pulse count after the storing reference signal is outputted from the photointerruptor 48. As described above, the screw member 45 (contact portion 45*d*) reaches the stored position S, so that the compression torsion spring 46 is most charged in the axis direction (linearly biasing direction) and in the rotation direction about the axis (rotationally biasing direction).

As described above, in the lens barrel 10, as shown in FIG. 21, the screw member 45 moved along the fourth group lead screw 44 controls the rotational orientation of the fourth lens retaining frame 41 in incorporation with the cam surface 96*b* and the compression torsion spring 46 within a range where the contact side portion 45*u* of the contact portion 45*d* is between the height position R1 capable of being engaged with the lower end portion of the cam surface 96*b* and the height position Rh capable of being engaged with the upper end portion of the cam surface 96*b*. This range is referred to as a rotation orientation controlling section. At this time, in the fourth lens retaining frame 41, the lower end surface 95*c* of the fourth lens retaining frame 41 (rear axis fitting portion 95 of the fourth lens retaining frame turning base portion 93) comes into contact with the lens barrel base 81 regardless of the rotational orientation (see FIG. 19).

In the lens barrel 10, in a range where the upper surface 45*s* (the upper end surface 45*h* of the screw member 45) of the contact portion 45*d* is positioned at the front side from the height position L1 capable of coming into contact with the front engagement surface 96*d*, the screw member 45 moved along the fourth group lead screw 44 controls the position (wide angle position W or telephoto position T as shown in FIG. 19) of the fourth lens retaining frame 41, that is, the fourth lens group 14, which is viewed in the direction of the photographic optical axis OA in cooperation with the front engagement surface 96*d* and the compression torsion spring 46. This range is referred to as an optical axis position controlling section.

Therefore, in the lens barrel 10, if the screw member 45 is positioned between the rotation orientation controlling section and the optical axis position controlling section, that is, between the height position Rh and the height position L1, the rotation orientation and the position on the optical axis of the fourth lens retaining frame turning base portion 93, that is, the fourth lens retaining frame 41 can be switched without performing both controls. Hereinafter, a section between the height position Rh and the height position L1 is a control switching section.

In the lens barrel 10, as described above, after completing the storing operation, storing operation of the third lens retaining frame 31 is permitted. The third lens retaining frame 31 (the third lens group 13) and the driving mechanism thereof has basically the same configuration as the fourth lens retaining frame 41 (the fourth lens group 14) and the driving mechanism thereof, except for the rotational direction and the height position in the photographic optical axis OA and therefore explanation in detail will be omitted.

The third lens retaining frame 31 is, as shown in FIGS. 2 and 3, configured to retain the third lens group 13 at one end and is supported movably by the third group main guide shaft 32 substantially parallel to the photographic optical axis OA of the third lens group 13 and slidably movably along the third group main guide shaft 32. The third lens retaining frame 31 rotates about the third group main guide shaft 32 between in a position on the photographic optical axis OA where the third lens group 13 is inserted and positioned on the photographic optical axis OA in the photographic state (see FIG. 3) and the stored position where the third lens group 13 is retracted out of the fixed cylinder 21*a* of the fixed frame 21 (outside of the movable cylinder, that is, storing space 21Q) in the collapsed stored state (see FIG. 2). The third lens retaining frame 31 is positioned on the photographic optical axis OA (see FIG. 3) by the stopper 31a coming into contact with the third group sub guide shaft 33 by the rotation biasing force (moment force) from the compression torsion spring 36 when being inserted into the photographic optical axis OA. Furthermore, the third lens retaining frame 31 positioned on the photographic optical axis OA is capable of being gradually moved from the object side to the image plane side while keeping the position on the photographic optical axis OA.

The third lens retaining frame 31 is moved toward the image plane side by the pulse counter from when the storing reference signal of the third lens retaining frame 31 from H to L generated by the third group reference detector (the third group photointerruptor which is not illustrated in detail) to be stored in the storing space 21Q which is the stored position (see FIG. 2). In the lens barrel 10, after completing the storing operation, the first rotary cylinder 22, the first liner 23, and elements positioned inner side thereof, that is, a front side of the base ends thereof are collapsed and stored, The third lens retaining frame 31 can be collapsed and stored without interference with these elements so that the first rotary cylinder 22, and the like can be safely collapsed and stored.

Figure 23:
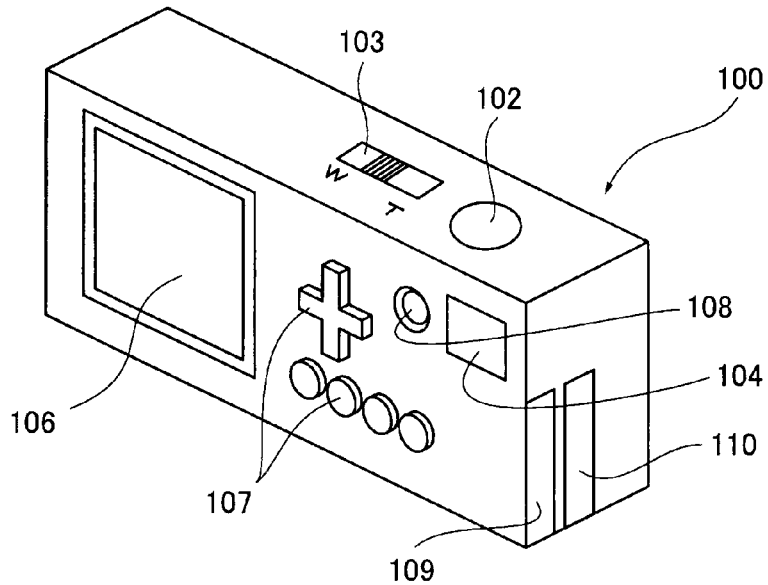
FIG. 23 is a schematic perspective view showing an appearance of the camera viewed from a back side, that is, a side of a photographer.
Figure 24:
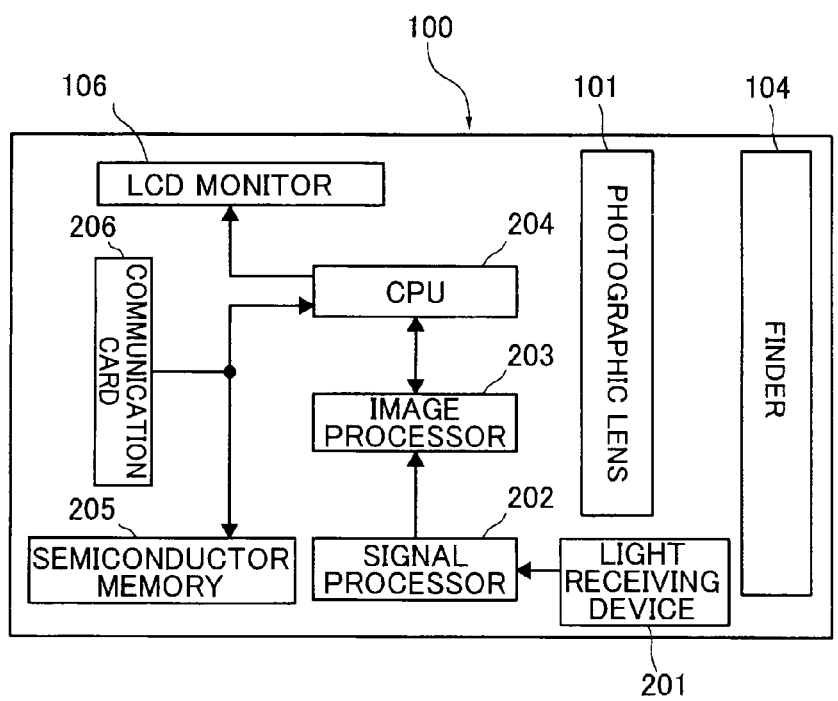
FIG. 24 is a block diagram showing a function configuration of the camera.

Next, a camera 100 as an imaging apparatus as the optical system device including the lens barrel 10 according to the above-described embodiment as a photographic optical system will be explained with reference to FIGS. 22 to 24. FIG. 22 is a perspective view showing an appearance of the camera 100 viewed from a front side, that is, a side of an object, that is, a photographic subject. FIG. 23 is a perspective view showing an appearance of the camera 100 viewed from a back side, that is a side of a photographer. FIG. 24 is a block diagram showing a functional configuration of the camera 100. Here, although the camera 100 is explained, a recently-produced mobile information terminal in which a camera function is installed, such as a so-called PDA (personal data assistant), a mobile phone, and the like can be applied.

That is, such a mobile information terminal has often substantially same function and configuration except for the appearance and the lens barrel 10 according to an embodiment of the present invention can be used. Similarly, an optical device including the lens barrel 10 according to an embodiment of the present invention can be used in an image input device.

As shown in FIGS. 22 and 23, the camera 100 has a photographic lens 101, a shutter button 102, a zoom lever 103, a finder 104, a strobe 105, a liquid crystal display monitor 106, operation buttons 107, a power switch 108, a memory card slot 109, and a communication card slot 110, and the like. Furthermore, as shown in FIG. 24, the camera 100 has a light receiving device 201, a signal processor 202, an image processor 203, a central processing unit (CPU) 204, a semiconductor memory 205, and a communication card 206, and the like. Although it is not clearly illustrated, each component is operated by power fed from a battery as a driving power source.

The camera 100 has the light receiving device 201 as an area sensor such as a CCD (charge-coupled device) image pickup device and is configured to read an image of the object to be photographed, that is, a subject, which is formed through the photographic lens 101 as the photographic optical system by using the light receiving device 201. As the photographic lens 101, the optical system device including the lens barrel 10 according to an embodiment of the present invention as described above is used. Particularly, lenses as optical elements constituting the lens barrel 10 is used to form the optical system device. For example, the light receiving device 201 is configured by using the solid-state image pickup device 16 (see FIG. 4). The lens barrel 10 has a mechanism for retaining at least each lens group and operating to be moved. The photographic lens 101 to be installed in the camera 100 is normally installed as the optical system device.

Output of the light receiving device 201 is processed by the signal processor 202 controlled by CPU 204 to be converted into digital image information. The digital image information obtained by the signal processor 202 is processed with predetermined image processing and then stored in the semiconductor memory 205 such as a nonvolatile memory. In this case, the semiconductor memory 205 may be the memory card loaded on the memory card slot 109 and the semiconductor memory built in the camera body. On the liquid crystal display monitor 106, an image during photographing can be displayed, and an image stored in the semiconductor memory 205 can be displayed. Further, the image stored in the semiconductor memory 205 can be transmitted to outside via the communication card 206 loaded in the communication card slot 110, and the like.

Figure 22A:
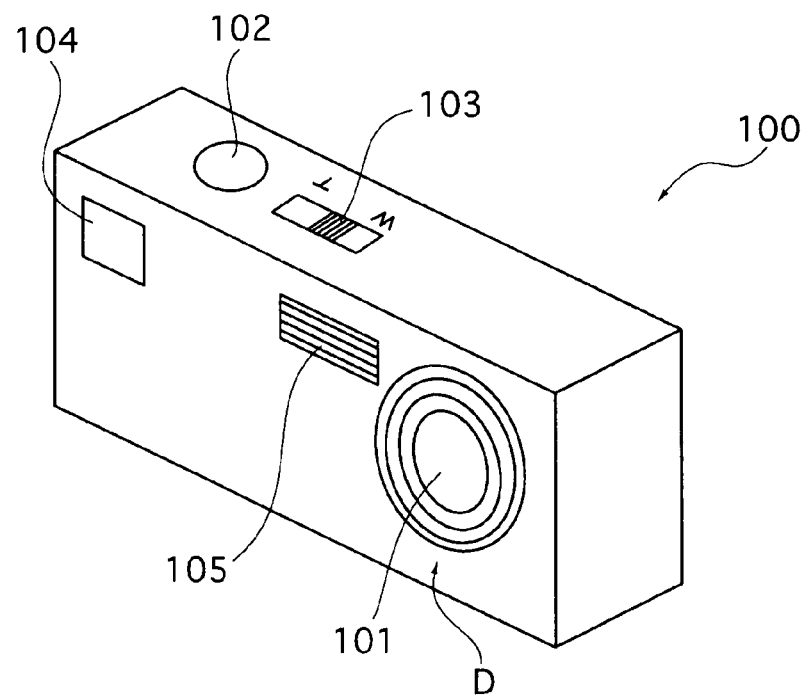
FIG. 22A is a perspective view schematically showing an appearance of a camera using the lens barrel according to an embodiment of the present invention in a state where a photographic lens is collapsed and stored in a camera body.
Figure 22B:
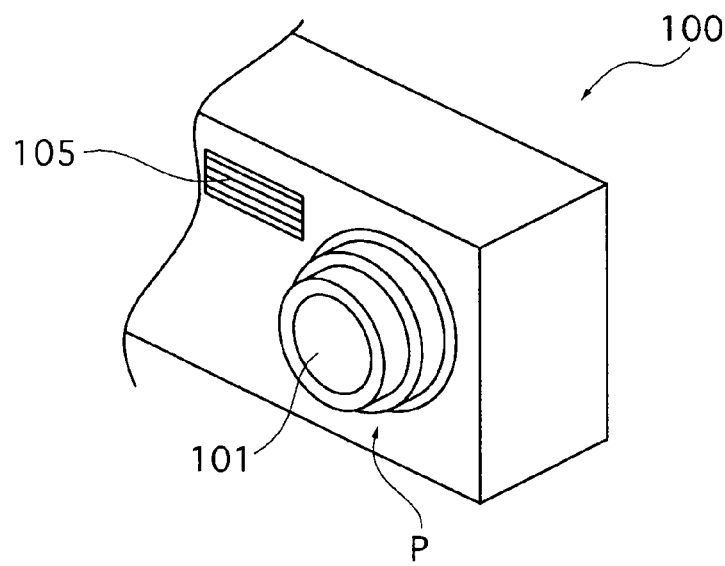
FIG. 22B is a perspective view schematically showing an appearance of the camera using the lens barrel according to an embodiment of the present invention in a state where the photographic lens extends from the camera body.

The photographic lens 101 is buried in a body of the camera 100 in the collapsed state as shown in FIG. 22A when the camera 100 is carried. When a user operate the power switch 108, the power is turned on and the lens barrel extends out as shown in FIG. 22B, so that the lens barrel is projected from the body of the camera 100 to be in the photographic state P. At this time, inside the lens barrel 10 of the photographic lens 101, each group of optical elements constituting the zoom lens is disposed at, for example, a wide angle position and by operating the zoom lever 103, arrangement of each group of the optical elements is changed and changing magnification to telephoto end can be performed.

An optical system of the finder 104 is preferably configured to change magnification in accordance with change of field angle of the photographic lens 101.

In many cases, the shutter button 102 is half-pressed to perform focusing. Focusing in the zoom lens according to an embodiment of the present invention can be performed mainly by moving the fourth lens group 14. The shutter button is further full-pressed to perform photographing and then the above described operations are performed.

To display the image stored in the semiconductor memory 205 on the liquid crystal display monitor 106 or transmit the image to outside via the communication card 206 or the like, the operation button 107 is operated as predetermined. The semiconductor memory 205 and the communication card 206 are loaded in exclusive- or universal-use slot such as the memory card slot 109, the communication card slot 110, and the like to be used.

When the photographic lens 101 is in the collapsed state, the third lens group 13 and the fourth lens group 14 are retracted from the photographic optical axis OA and stored in parallel with the first lens group 11 and the second lens group 12 (see FIGS. 2 and 4) so that it is possible to further reduce thickness of the camera 100.

In the lens barrel 10 according to an embodiment of the present invention, as described above, the fourth group motor 53 is rotated in an anti-clockwise direction in FIGS. 10 and 11 (an anti-clockwise direction viewed from the front side of the lens barrel). Thereby, the fourth group lead screw 44 is rotated in a clockwise direction via the gear mechanism configured by the gears 71 to 74 so that the screw member 45 is moved along the photographic optical axis OA from the stored position S to the object side (see FIG. 19). In the lens barrel 10, when moving the fourth lens group 14 from the stored position (collapsed stored state D as shown in FIG. 10) to the photographic position (the photographic state P as shown in FIG. 11) on the photographic optical axis OA, the screw member 45 is moved from the storing position S to the upper end position of the rotation orientation controlling section, that is, from the storing position S to the height position Rh via the height position R1 (see FIG. 21). At this time, the fourth lens retaining frame turning base portion 93, that is, the fourth lens retaining frame 41 is rotated, by the rotational biasing force of the compression torsion spring 46, in accordance with the position of the contact portion 45d (contact side portion 45u thereof) of the screw member 45 relative to the position in the rotation orientation controlling section of the screw member 45, that is, the cam surface 96b.

When the screw member 45 is positioned between the height position Rh and the height position L1 (the retracting start position B), by the rotational biasing of the compression torsion spring 46, the fourth lens retaining frame 41 (the stopper 41a) is pressed on the fourth group sub guide shaft 43 and the rack portion 45e (screw groove thereof) of the screw member 45 is pressed on the fourth group lead screw 44 (screw groove thereof).

After that, when the screw member 45 is positioned at the height position L1 (retracting start position B), by the linearly biasing of the compression torsion spring 46, the upper end surface 45h of the screw member 45 is pressed on the front engagement surface 96d (lower end surface of the front axis fitting portion 94 as shown in FIG. 19) of the connection wall portion 96 of the fourth lens retaining frame turning base portion 93. Accordingly, it is possible to move the fourth lens retaining frame 41 together with the screw member 45 in the direction of the photographic optical axis OA.

When the screw member 45 is moved to the front side (object side) than the height position L1 (retracting start position B), as described above, the height position is appropriately controlled. Thereby the position (for example, wide angle position W or telephoto position T) of the fourth lens retaining frame 41, that is, the fourth lens group 14 viewed in the direction of the photographic optical axis OA is controlled.

In the lens barrel 10 of the embodiment of the present invention, when the screw member 45 is positioned at the height position Rh, by the rotation biasing of the compression torsion spring 46, the fourth lens retaining frame 41 (the stopper 41a) is pressed on the fourth group sub guide axis 43 and the rack portion 45e (screw groove thereof) of the screw member 45 is pressed on the fourth group lead screw 44 (screw groove thereof). Therefore, the fourth lens group 14 retained by the fourth lens retaining frame 41 is positioned on the photographic optical axis OA (photographic position) and the rack portion 45e (screw groove thereof) of the screw member 45 is pressed on the fourth group lead screw 44 (screw groove thereof) to be appropriately screwed with each other. As described above, the screw member 45 is pressed on the fourth group lead screw 44 by the rotation biasing of the compression torsion spring 46, and therefore, the rack portion 45e (screw groove thereof) of the screw member 45 and the fourth group lead screw 44 (screw groove thereof) can be screwed with each other in an appropriate state where backlashes in the direction of the photographic optical axis OA and the direction perpendicular thereto are removed. Thereby, regardless of the rotational direction of the fourth group lead screw 44, the position of the screw member 45 along the fourth group lead screw 44 can be constant. In detail, in the lens barrel 10 according to the embodiment, the screw groove of the rack portion 45e of the screw member 45 comes into contact with the screw groove of the fourth group lead screw 44 (see FIG. 17) at both of the object side surface (front direction, upper side of the drawing) and the image plane side surface (rear direction, lower side of the drawing) by the rotation biasing of the compression torsion spring 46. Therefore, the screw member 45 (screw groove of the rack portion 45e) and the fourth group lead screw 44 (screw groove thereof) come into contact with each other by the rotation of the fourth group lead screw 44 at both of the front side and the rear side in the moving direction of the screw member 45 moving along the fourth group lead screw 44 so that the screwed state (contact state) with the screw grooves can be constant regardless of the rotational direction of the lead screw 44. Accordingly, regardless of the rotational direction of the fourth lead screw 44, the position of the fourth lens group 14 retained by the fourth lens retaining frame 41 in the photographic optical axis OA can be constant. As a result, the position of the fourth lens group 14 on the photographic optical axis OA can be accurately controlled.

Furthermore, in the lens barrel 10 according to the embodiment, the screw member 45 (screw groove of the rack portion 45 thereof) is pressed on the fourth group lead screw 44 in a direction perpendicular to an axis line. Thereby, the screw member 45 and the fourth group lead screw 44 are screwed with each other and therefore the rotational driving force of the fourth group lead screw 44 does not affect the screw member 45 as the rotation force about the axis line thereof, that is, a force for separating the rack portion 45e from the fourth group lead screw 44. Accordingly, the screwing of the screw member 45 (screw groove of the rack portion 45e) and the fourth group lead screw 44 (screw groove thereof) can be prevented from being released. Therefore, it is prevented that the screw member is rotated with the rotation of the lead screw about the axis line thereof, as being conventionally configured. Accordingly, hitting sound due to the rotation of a rotation stop projected portion provided on the screw member when the rotation of the lead screw in a guide groove is inversed can be prevented from occurring.

Furthermore, in the lens barrel 10 according to the embodiment, by the rotation biasing of the compression torsion spring 46, the stopper 41a of the fourth lens retaining frame 41 comes into contact with and is engaged with the fourth group sub guide shaft 43 so that the position of the fourth lens group 14 is kept on the photographic optical axis OA. Therefore, even if the fourth lens retaining frame 41, that is, the fourth lens group 14 is moved along the photographic optical axis OA, the position of the fourth lens group 14 can be easily kept on the photographic optical axis OA.

In the lens barrel 10 of the embodiment, by the linearly biasing of the compression torsion spring 46, the upper end surface 45h (upper surface 45s of the contact portion 45d) of the screw member 45 is pressed on the front engagement surface 96d (lower end surface of the front axis fitting portion 94 as shown in FIG. 19) of the connection wall portion 96 of the fourth lens retaining frame base portion 93. Thereby, the screw member 45 and the fourth lens retaining frame turning base portion 93 (the fourth lens retaining frame 41) can be moved together with each other. By controlling the fourth group lead screw 44 to be rotated to control the height position of the screw member 45 in the direction of the photographic optical axis OA so that the position of the fourth lens retaining frame 41, that is, the fourth lens group 14 on the photographic optical axis OA can be controlled with high accuracy.

In the lens barrel 10 of the embodiment, backlash in the direction of the photographic optical axis OA in the fourth group lead screw 44 is displaced to one side by the screw biasing piece 47. Therefore, backlash in the direction of the photographic optical axis OA in the fourth group lead screw itself can be removed. Accordingly, the position of the screw member 45 (screw groove of the rack portion 45e) screwed with the fourth group lead screw 44 (screw groove) in the direction of the photographic optical axis OA can be controlled with high accuracy by rotational driving of the fourth group lead screw 44 and the position of the fourth lens retaining frame 41, that is, the fourth lens group 14 on the photographic optical axis OA can be controlled with high accuracy.

Figure 21:
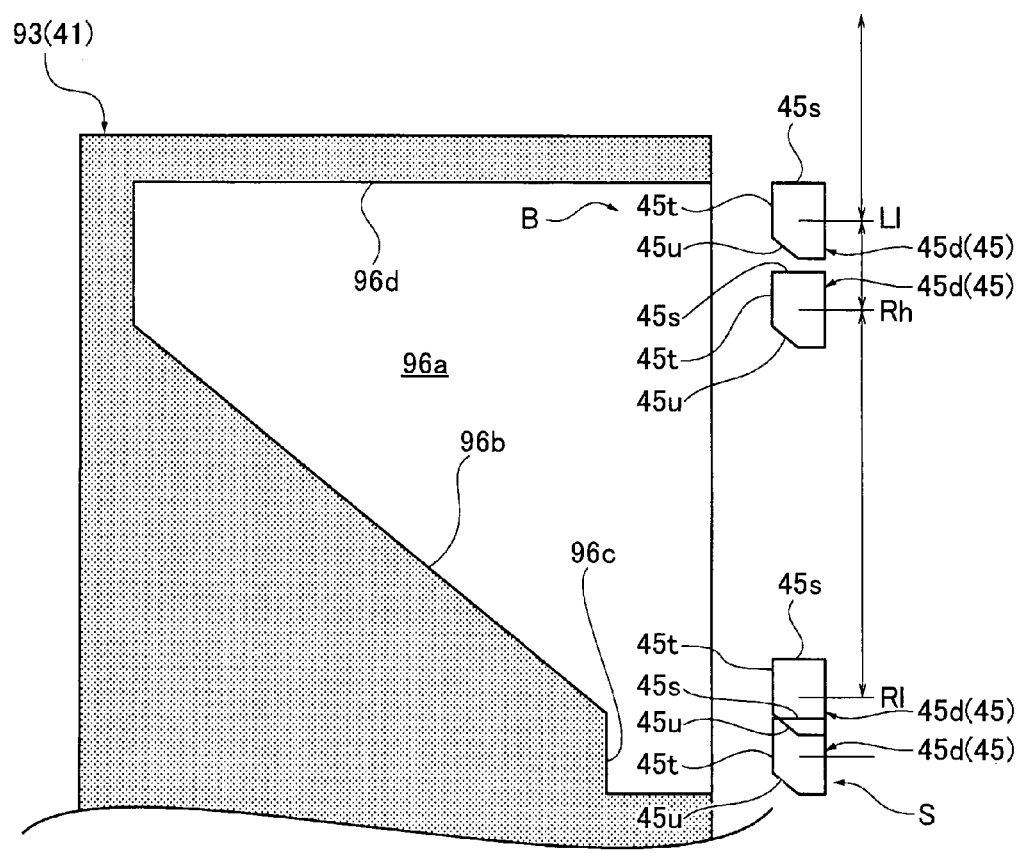
FIG. 21 is an explanatory view explaining operation for a height position of the screw member (contact portion).

In the lens barrel 10 of the embodiment, in a screwed state where the rack portion 45e (screw groove thereof) of the screw member 45 is appropriately screwed with the fourth group lead screw 44 (screw groove), the sliding wall portion 49 is provided at a position such that an interval C between the sliding contact surface 45g and the sliding wall portion 49 is smaller than the engagement amount H (see FIG. 18) of the rack portion 45e with the fourth group lead screw 44 (H>C). Therefore, even if the screw member 45 is moved about the fourth group main guide shaft 42 in the direction separating the rack portion 45e from the fourth group lead screw 44, the sliding contact surface 45g of the screw member 45 comes into contact with the sliding wall portion 49 before screwing of the rack portion 45e with the fourth group lead screw 44 is released. Accordingly, screwing of the rack portion 45e with the fourth group lead screw 44 can be surely prevented from being released. Such a rotation of the screw member 45 may occur due to the following reasons. If the screw member 45 is positioned between the stored position S and the height position Rh (most front position where the contact side portion 45u of the contact portion 45d comes into contact with the cam surface 96b, as shown in FIG. 21), the force for reducing the interval between the one arm portion 46a and the other arm portion 46b affects the compression torsion spring 46. Therefore, it is not possible that the fourth lens retaining frame 41 (stopper 41a) is pressed on the fourth group sub guide shaft 43 while the rack portion 45e of the screw member 45 is pressed on the fourth group lead screw 44. Here, if the contact portion 45d (contact side portion 45u) of the screw member 45 comes into contact with and is engaged with the cam surface 96b (stepped portion 96a of the connection wall portion 96) of the fourth lens retaining frame 41, a reaction force from the cam surface 96b and a biasing force from the cam surface 96b by the rotational biasing of the compression torsion spring 46 affect the contact portion 45d. The reactive force and the biasing force acts such that a part of the forces affects the contact portion 45d in a direction separating from the cam surface 96b along a plane perpendicular to the photographic optical axis OA (see arrow F1 in FIG. 20B). Furthermore, if the contact portion 45d (side surface 45t) of the screw member 45 comes into contact with and is engaged with the side engagement surface 96c (of the stepped portion 96a of the connection wall portion 96) of the fourth lens retaining frame 41, a biasing force from the side engagement surface 96c by the rotational biasing of the compression torsion spring 46 affects the contact portion 45d. The biasing force affects the contact portion 45d in a direction of being separated from the cam surface 96b along the plane perpendicular to the photographic optical axis OA (see arrow F2 in FIG. 20C). These biasing forces (F1 and F2) to the contact portion 45d affect, as shown in FIG. 18, the screw member 45 as the rotationally biasing force (see arrow F3) about the fourth group main guide shaft 42 so as to separate the contact portion 45d from the stepped portion 96a. Accordingly, if the screw member 45 is rotated by the rotationally biasing force, it is possible that the rack portion 45e is separated from the fourth group lead screw 44 (screwing is released).

In the lens barrel 10 of the embodiment, in a state where the rack portion 45e (screw groove thereof) of the screw member 45 and the fourth group lead screw 44 (screw groove thereof) are appropriately screwed with each other, the interval C is provided between the sliding contact surface 45g of the screw member 45 and the sliding wall portion 49 so that the movement of the screw member 45 along the fourth group lead screw 44 can be smoothly performed.

In the lens barrel 10 of the embodiment, the sliding wall portion 49 is set to have a length capable of facing the sliding contact surface 45g when the screw member 45 moved along the fourth group lead screw 44 is positioned between the stored position S and the height position Rh (most front position where the contact side portion 45u of the contact portion 45d comes into contact with the cam surface 96b, as shown in FIG. 21) and the sliding wall portion 49 extends from the fixed frame 21 toward the object side in the direction of the photographic optical axis OA. Accordingly, screwed state of the rack portion 45e (screw groove thereof) of the screw member 45 with the fourth group lead screw 44 (screw groove thereof) can be firmly held with a minimum length. This is because, in a state where the screw member 45 (contact portion 45d) is moved toward the front side (object side) than the height position Rh (see FIG. 21), as described above, the compression torsion spring 46 presses the fourth lens retaining frame 41 (stopper 41a) onto the fourth group sub guide shaft 43 and the rack portion 45e of the screw member 45 onto the fourth group lead screw 44 so that the rotation of the screw member 45 about the fourth group main guide shaft 42 in the direction so as to separate the rack portion 45e from the fourth group lead screw 44 is prevented.

In the lens barrel 10 of the embodiment, the fourth lens retaining frame 41 and the screw member 45 are provided on the single fourth group main guide shaft 42 so that a simple and small configuration can be achieved to contribute to a small size device.

In the lens barrel of the embodiment, the stepped portion 96a as the cam structure is formed on the inner wall surface of the connection wall portion 96 of the fourth lens retaining frame turning base portion 93 of the fourth lens retaining frame 41 and the screw member 45 having the contact portion 45d as the cam structure is provided at the inner position (in a space between the front axis fitting portion 94 and the rear axis fitting portion 95) of the connection wall portion 96 so that a small configuration can be achieved to contribute a small size device.

In the lens barrel 10 of the embodiment, the fourth lens retaining frame 41, the screw member 45, and the compression torsion spring 46 are provided on the single fourth group main guide shaft 42 so that a simple and small configuration can be achieved to contribute to a small size device.

In the lens barrel 10 of the embodiment, the fourth lens retaining frame arm portion 92 of the fourth lens retaining frame 41 is fixed to the one arm portion 46a of the compression torsion spring 46 and the engagement projection portion 45f of the engagement leg portion 45b of the screw member 45 is fixed to the other arm portion 46b. The compression torsion spring 46 is disposed between the fourth group sub guide shaft 43 and the fourth group lead screw 44, so as to reduce the interval between the one arm portion 46a and the other arm portion 46b. Accordingly, the fourth lens group 14 can be surely positioned on the photographic optical axis OA with a simple configuration and the screw member 45 (screw groove of the rack portion 45e) can be pressed on the fourth group lead screw 44 (screw groove thereof).

In the lens barrel of the embodiment, by the single compression torsion spring 46, the rotation biasing for pressing the screw member 45 (screw groove of the rack portion 45e) on the fourth group lead screw 44 (screw groove thereof), the rotation biasing for allowing the fourth lens retaining frame 41 (stopper 41a) to come into contact with and to be engaged with the fourth group sub guide shaft 43, and the linearly biasing for pressing the screw member 45 (upper end surface 45h) onto the fourth lens retaining frame 41 (front engagement surface 96d of the connection wall portion 96 of the fourth lens retaining frame turning base portion 93) can be performed. Accordingly, a simple and small configuration can be achieved to contribute to a small size device.

The above described effects can be obtained for the third lens group 13 because the third lens retaining frame 31 and the driving mechanism thereof have the similar configurations to the fourth lens retaining frame 41 and the driving mechanism thereof.

In the lens barrel 10 of the embodiment, the fourth lens retaining frame 41 and the third lens retaining frame 31 can be retracted to a position out of the fixed cylinder 21a of the fixed frame 21 and out of the maximum outer diameter of the movable cylinder in the collapsed state, that is, to the storing space 21Q positioned outside the maximum outer diameter of the first rotary cylinder 22. Accordingly, size in the direction of the photographic optical axis when the movable cylinders are stored cab be reduced without increasing the outer diameter of the fixed cylinder.

Accordingly, in the lens barrel 10 according to an embodiment of the present invention (and the camera 10 having the same), generation of hitting sound with movement of the retractable lens retaining frame 31, 41 retracting the lens group 14 outside the inner diameter of the movable cylinder 22 is prevented while the position accuracy of the retractable lens retaining frame 31, 41 in the direction of the photographic optical axis OA can be improved.

In the above-described embodiment, although the lens barrel 10 as an example of the lens barrel according to the present invention is explained, it may include the retractable lens retaining frame configured to movably retain a retractable lens having at least one lens so as to retract the retractable lens out of an inner diameter position of the movable lens in a collapsed state by a driving force from the driving mechanism. The driving mechanism has a main guide shaft disposed parallel to the photographic optical axis and configured to support the retractable lens retaining frame movably along a longitudinal direction and rotatably about an axis line thereof, a lead screw disposed parallel with the main guide shaft and configured to be driven to rotate, a screw member capable of being screwed with the lead screw by coming into contact with the lead screw in a direction parallel to an axis line of the lead screw so as to be moved along the lead screw by rotation of the lead screw, a cam structure configured to connect the retractable lens retaining frame and the screw member so as to convert movement of the screw member along the lead screw into rotary motion about the main guide shaft in the retractable lens retaining frame and linear motion along the main guide shaft, and a pressing device configured to press the screw member toward the lead screw so as to come into contact with the lead screw in a direction perpendicular to the axis line of the lead screw. Accordingly, the invention is not limited to the above described embodiment.

Furthermore, in the above described embodiment, the configuration in that both of the third lens group 13 and the fourth lens group 14 are retracted, that is, both of the third lens retaining frame 31 and the fourth lens retaining frame 41 are retractable lens retaining frame. However, only one of the third and fourth lens retaining frames may be used as the retractable lens retaining frame or a lens retaining frame configured to retain another lens group may be used as the retractable lens retaining frame, and therefore the invention is not limited to the above described embodiment.

In the above described embodiment, in the driving mechanism of the fourth lens retaining frame 41, the cam structure is configured by the stepped portion 96a and the contact portion 45d. However, it is only necessary to convert the movement of the linearly moved screw member 45 into the rotary motion about the fourth group main guide shaft 42 and the linear motion along the main guide shaft 42 in the fourth lens retaining frame 41 and therefore the present invention is not limited to the above described embodiment.

According to a lens barrel of an embodiment of the present invention, the screw member is pressed by the screw member pressing device to come into contact with the lead screw so that the screw member and the lead screw can be appropriately screwed with each other. Therefore, regardless of the rotational direction of the lead screw, the position of the screw member along the lead screw can be kept constant. Accordingly, regardless of the rotational direction of the lead screw, the position of the retractable lens retaining frame can be kept constant so that the position of the retractable lens retained thereby on the photographic optical axis can be controlled with high accuracy.

The screw member comes into contact with the lead screw in the direction perpendicular to the axis line of the lead screw. Accordingly, the rotation driving force of the lead screw does not affect the screw member as the rotation force about the axis line so that screwing of the screw member with the lead screw can be prevented from being released. Therefore, it is not possible that the screw member is rotated about the axis line with the rotation of the lead screw as being conventionally configured. Accordingly, in the guide groove of the rotation stop projected portion provided on the screw member when the rotation of the lead screw is inversed, hitting sound due to the rotation can be prevented from being generated.

In addition to the above-described configurations, the driving mechanism may include a positioning member provided in the movable cylinder and capable of coming in contact with the retractable lens retaining frame rotated about the axis line of the main guide shaft to position the retractable lens group to a position on the photographic optical axis, and a retaining frame rotary motion biasing device configured to bias the retractable lens retaining frame to be rotated toward the positioning member so as to allow the retractable lens retaining frame to come in contact with the positioning member in rotary directions about the main guide shaft. Accordingly, it is possible to position the retractable lens on the photographic optical axis with a simple configuration.

In addition to the above-described configurations, the driving mechanism may include a retaining frame linearly biasing device configured to press the screw member and the retractable lens retaining frame in a direction along the main guide shaft to move the retractable lens retaining frame along the main guide shaft together with the screw member moving along the main guide shaft. Accordingly, by controlling the rotation of the lead screw and the height position of the screw member in the photographic optical direction, it is possible to control the position of the retractable lens retaining frame, that is, the retractable lens on the photographic optical axis with high accuracy.

In addition to the above described configurations, the screw member may be supported movably along the longitudinal direction of the main guide shaft and rotatably about the axis line of the main guide shaft. Accordingly, a simple and small configuration can be achieved to contribute to a small size device.

In addition to the above described configurations, the screw member pressing device and the retaining frame rotational biasing device may be configured by a single compression torsion spring. Accordingly, it is possible that the retractable lens is firmly positioned on the photographic optical axis and the screw member is pressed on the lead screw with a simple configuration.

In addition to the above configurations, the screw member pressing device, the retaining frame rotational biasing device, and the retaining frame linearly biasing device may be configured by a single compression torsion spring. Accordingly, a simple and small configuration can be achieved to contribute to a small size device.

In addition to the above configurations, the lens barrel may include a sliding wall portion disposed so as to face a rear surface of the screw member opposite to a screwed part of the screw member screwed on the lead screw and the sliding wall portion is set to be positioned such that an interval between the rear surface and the sliding wall portion is smaller than an engagement amount between the screw member and the lead screw in a state where the screw member is appropriately screwed with the lead screw. Accordingly, even if the screw member is moved about the main guide shaft in a direction for separating the screwed part from the lead screw, since the rear surface of the screw member comes into contact with the sliding wall portion before the screwing of the screwed part with the lead screw can be surely prevented from being released.

Although the present invention has been described in terms of exemplary embodiments, it is not limited thereto. It should be appreciated that variations may be made in the embodiments described by persons skilled in the art without departing from the scope of the present invention as defined by the following claims.

What is claimed is:

1. A lens barrel comprising:
    a plurality of lens groups including a retractable lens group having at least one lens;
    a plurality of lens retaining frames configured to retain the plurality of lens groups, respectively, between a collapsed state in which at least one portion of the plurality of lens groups is stored and a photographic state in which the at least one portion of the plurality of lens groups is moved toward an object side, the plurality of lens retaining frames including a retractable lens retaining frame configured to retain the retractable lens group;
    a movable cylinder configured to retain the plurality of lens retaining frames therewithin; and
    a driving mechanism configured to move the plurality of lens retaining frames so as to position the plurality of lens groups on a photographic optical axis in the photographic state and retract the retractable lens group to a position outside an inner diameter of the movable cylinder in the collapsed state,
    wherein the driving mechanism includes
        a main guide shaft disposed parallel to the photographic optical axis and configured to support the retractable lens retaining frame movably along a longitudinal direction of the main guide shaft and rotatably about an axis line of the main guide shaft,
        a lead screw disposed in parallel with the main guide shaft and configured to be driven to rotate,
        a screw member configured to be screwed on the lead screw by coming into contact with the lead screw in directions perpendicular to an axis line of the lead screw to be moved along the lead screw by a rotation of the lead screw,
        a cam structure configured to connect the retractable lens retaining frame with the screw member to convert a movement of the screw member along the lead screw into a rotary motion of the retractable lens retaining frame about the main guide shaft and a linear motion of the retractable lens retaining frame along the main guide shaft,
        a screw member pressing device configured to press the screw member toward the lead screw so as to come into contact with the lead screw in the directions perpendicular to the axis line of the lead screw, and the screw member pressing device is configured to move the screw member and the retractable lens retaining frame integrally in a direction of the optical axis, and
        a rotational biasing device configured to apply a force to the screw member and to the retractable lens retaining frame to bias the screw member and the retractable lens retaining frame in opposite rotational directions from one another.

2. The lens barrel according to claim 1, wherein the driving mechanism includes
    a positioning member provided in the movable cylinder and capable of coming into contact with the retractable lens retaining frame rotated about the axis line of the main guide shaft to position the retractable lens group on the photographic optical axis, and
    the rotational biasing device is configured to bias the retractable lens retaining frame to be rotated toward the positioning member so as to allow the retractable lens retaining frame to come into contact with the positioning member in a rotational direction about the main guide shaft.

3. The lens barrel according to claim 2, wherein the screw member pressing device and the rotational biasing device are formed by a single compression torsion spring.

4. The lens barrel according to claim 1, wherein
    the driving mechanism includes a retaining frame linearly biasing device configured to press the screw member and the retractable lens retaining frame in a direction along the main guide shaft so as to move the retractable lens retaining frame along the main guide shaft together with the screw member moving along the main guide shaft.

5. The lens barrel according to claim 4, wherein the screw member pressing device, the rotational biasing device, and the retaining frame linearly biasing device are formed by a single compression torsion spring.

6. The lens barrel according to claim 1, wherein the screw member is supported movably along the longitudinal direction of the main guide shaft and rotatably about the axis line of the main guide shaft.

7. The lens barrel according to claim 6, wherein the screw member pressing device, the rotational biasing device, and the retaining frame linearly biasing device are formed by a single compression torsion spring.

8. The lens barrel according to claim 1, further comprising:
    a sliding wall portion disposed so as to face a rear surface of the screw member opposite to a screwed part of the screw member screwed on the lead screw,
    wherein the sliding wall portion is configured to be positioned such that an interval between the rear surface and the sliding wall portion is smaller than an engagement amount between the screw member and the lead screw in a state where the screw member is screwed on the lead screw.

9. An imaging apparatus, comprising the lens barrel according to claim 1.

10. A digital camera, comprising the lens barrel according to claim 1.

11. A mobile information terminal, comprising the lens barrel according to claim 1.

12. An image input apparatus, comprising the lens barrel according to claim 1.

13. The lens barrel according to claim 1, wherein the screw member is not a female screw member.

14. The lens barrel according to claim 1, wherein the portion of the screw member that contacts the lead screw is a rack portion of the screw member.

15. The lens barrel according to claim 14, wherein the rack portion of the screw member is configured to simultaneously contact an object side surface and an image plane side surface of screw grooves of the lead screw.

16. The lens barrel according to claim 1, wherein the screw member pressing device is configured to move the screw member and the retractable lens retaining frame toward the object side.

17. The lens barrel according to claim 1, wherein
the retractable lens retaining frame includes a front axis fitting portion and a rear axis fitting portion,
the screw member pressing device is disposed between the front axis fitting portion and the rear axis fitting portion, and
the screw member pressing device is configured to bias the screw member toward the front axis fitting portion.

* * * * *